(12) United States Patent
Hasegawa et al.

(10) Patent No.: US 6,385,506 B1
(45) Date of Patent: May 7, 2002

(54) ROBOT

(75) Inventors: Rika Hasegawa, Chiba; Makoto Inoue, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/701,091

(22) PCT Filed: Mar. 24, 2000

(86) PCT No.: PCT/JP00/01822
§ 371 Date: Nov. 22, 2000
§ 102(e) Date: Nov. 22, 2000

(87) PCT Pub. No.: WO00/56506
PCT Pub. Date: Sep. 28, 2000

(30) Foreign Application Priority Data

Mar. 24, 1999 (JP) .......................................... 11-080136

(51) Int. Cl.[7] .............................................. G06F 19/00
(52) U.S. Cl. ...................... 700/245; 700/247; 700/249; 700/253; 408/13; 408/30; 408/35; 409/233; 901/41; 29/407.04
(58) Field of Search ................................. 700/245, 247, 700/249, 253, 248; 483/13, 30, 35, 1; 409/232; 901/41, 1; 29/407.04; 701/23, 24; 180/167, 168, 169; 318/580, 590, 568.1, 568.12, 586

(56) References Cited

U.S. PATENT DOCUMENTS

| 4,546,443 A | * | 10/1985 | Ouguchi et al. ............. 700/253 |
| 5,148,591 A | * | 9/1992 | Pryor ...................... 29/407.04 |
| 5,179,329 A | * | 1/1993 | Nishikawa et al. .......... 318/587 |
| 5,488,277 A | * | 1/1996 | Nishikawa et al. .......... 318/587 |
| 5,568,030 A | * | 10/1996 | Nishikawa et al. .......... 318/587 |
| 5,752,904 A | * | 5/1998 | Iri ............................... 473/588 |
| 5,928,924 A | * | 7/1999 | Zelinkovsky ................ 701/24 |
| 5,959,672 A | * | 9/1999 | Sasaki .................... 375/240.23 |
| 6,272,479 B1 | * | 8/2001 | Farry et al. ..................... 706/13 |

FOREIGN PATENT DOCUMENTS

| JP | 62-55710 | 3/1987 |
| JP | 63-14201 | 1/1988 |
| JP | 10-58358 | 3/1998 |
| JP | 10-100045 | 4/1998 |
| JP | 10-289006 | 10/1998 |

OTHER PUBLICATIONS

First roboticx competition manual, 1999, Internet, pp. 5–15.*
First roboticx competition manual, 1999, Internet, pp. 1–4.*
Rillo et al., Integrating purposive vision with deliberative and reactive planning: engineering support for robotic applications, 200, Internet.*
Merinero–Pinataro et al., Intelligent operation for multiple manipulators in common workspaces, 2001, Internet, pp. 1–3.*
Coradeschi et al. "A Role Based Decision–Mechanism for Teams of Reactive Coordinating Agents", Lecture Notes in Artificial Intelligence 1395, 1998, pp. 112–122.
Fujita et al., "Reconfigurable Physical Agents", Proceedings of the Second International Conference on Autonomous Agents, May 9–13, 1998, pp. 54–61.

* cited by examiner

Primary Examiner—Jacques H. Louis-Jacques
Assistant Examiner—McDieunel Marc
(74) Attorney, Agent, or Firm—Frommer Lawrence & Haug LLP; William S. Frommer

(57) ABSTRACT

A motion deciding means is provided to decide a motion based on transmitted information which is transmitted from another robot apparatus, so that it is possible to realize a robot apparatus which operates in cooperation with other robot apparatuses regardless of operator's instructions. Thus, such robot apparatuses can constitute a group of robot apparatuses which autonomously move in cooperation.

9 Claims, 19 Drawing Sheets

ROBOT

TECHNICAL FIELD

The present invention relates to a robot apparatus and more particularly, is suitably applied to a robot apparatus which is adapted to operate in cooperation with other robot apparatuses.

BACKGROUND ART

Conventionally, there has been proposed and developed such cooperation for a group of robots that a plurality of robots changes their own motions in accordance with motions or the like of other robots. For example, in Japanese Patent Laid-Open No. 9-128025, there has been disclosed a robot control apparatus which operates a plurality of robots for use in a factory or the like in cooperation with each other. Also, in Japanese Patent Laid-Open No. 10-49188, it has been disclosed that such a feelings changing device as to show different responses, like a human being, in accordance with feelings when voice is inputted, is applicable to a robot.

In the plurality of robots for use in the above-described factory, each robot only operates on the basis of an instruction to be given from an operator through the robot control apparatus, and in a robot with the feelings changing device, it shows a response only when voice is inputted from the operator. So, these robots only operate in accordance with the instruction from the operator.

DISCLOSURE OF THE INVENTION

The present invention has been achieved in view of the above-described points, and is aimed to propose a robot apparatus which is the one of a group of robots and is capable of autonomously operating in cooperation with the other robot apparatuses.

In order to solve the above-described problem, according to the present invention, a robot apparatus adapted to operate in cooperation with other robot apparatuses comprises: an input means for receiving and inputting transmitted information which is transmitted from another robot apparatus; a motion decision means which extracts, from the transmitted information, discrimination information which is for specifying a robot apparatus targeted for transmission and communication information which is to be communicated to the robot apparatus targeted for transmission, and which compares the discrimination information with discrimination information allocated to the robot apparatus in advance to decide its motion on the basis of the comparison result and the communication information; and an operating means for operating in accordance with a motion decided by the motion decision means.

As a result, since the robot apparatus decides its motion on the basis of the transmitted information transmitted from another robot apparatus, it is possible to realize a robot apparatus which operates in cooperation with other robot apparatuses regardless of any instructions from the operator. Thus, such robot apparatuses can autonomously operate in cooperation with each other in a group.

BEST MODE FOR CARRYING OUT THE INVENTION

Hereinafter, with reference to the drawings, the detailed description will be made of an embodiment according to the present invention.

(1) CONFIGURATION OF AN ENTERTAINMENT ROBOT

Figure 1:
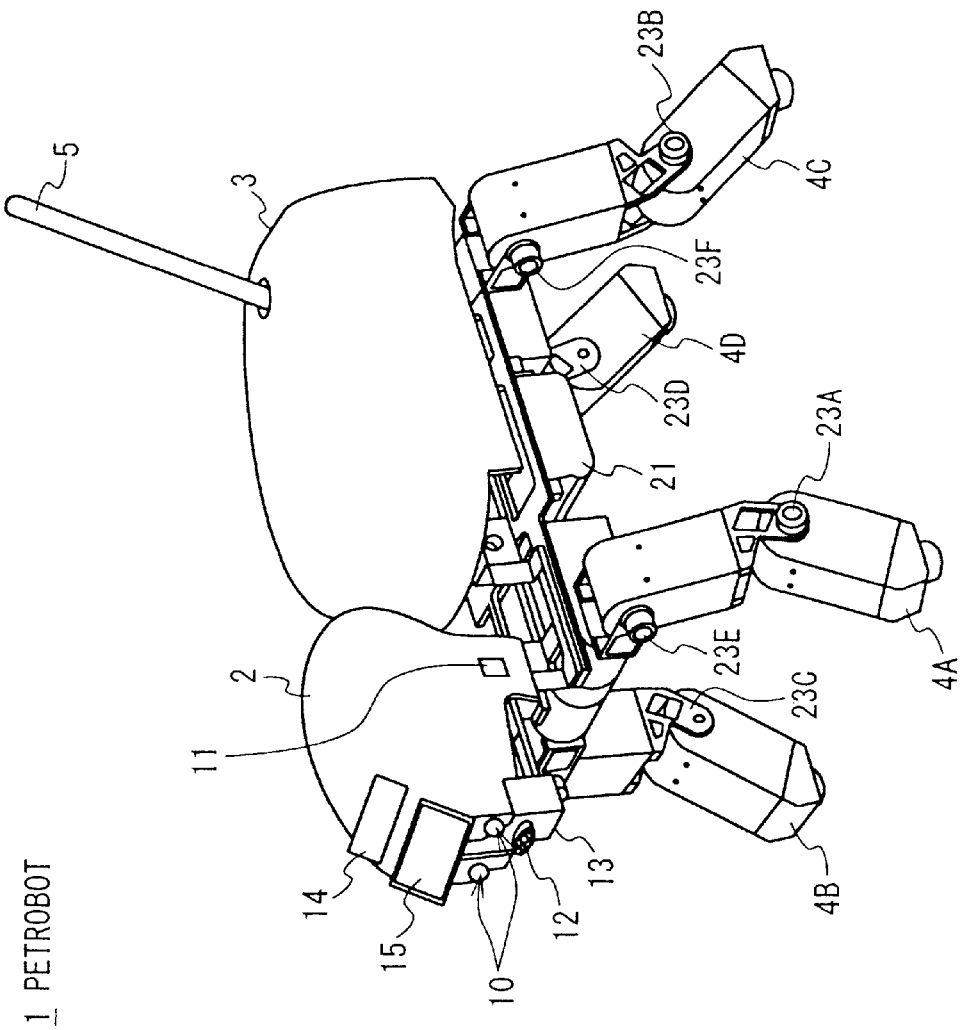
FIG. 1 is a schematic diagram showing an embodiment of entertainment robot according to the present invention.

In FIG. 1, a reference numeral 1 denotes an entertainment robot as a whole, for use in an entertainment field such as a soccer game, and is configured by coupling a head portion 2 corresponding to the head; a main body portion 3 corresponding to the trunk; foot portions 4A to 4D corresponding to the feet; and a tail portion 5 corresponding to the tail. The entertainment robot is adapted to operate like a quadruped by moving the head portion 2, the foot portions 4A to 4D and the tail portion 5 connected with the main body portion 3.

To the head portion 2, there are attached, at the respective predetermined positions, a television camera 10 corresponding to the eyes for picking up an image; a microphone 11 corresponding to the ears for collecting voice; and a speaker 12 corresponding to the mouth for giving voice. In addition, the head portion 2 is mounted with a touch sensor 14 for detecting the operator's hand or the like touched, and an LED (Light Emitting Diode) unit 15 for notifying the other entertainment robots of information which is generated inside.

In the main body portion 3, there are housed an electronic circuit (not shown) and the like for controlling actions of the entire entertainment robot 1. Joint portions of the foot portions 4A to 4D, coupled portions between the foot portions 4A to 4D and the main body portion 3, a coupled portion between the main body portion 3 and the head portion 2, a coupled portion between the main body portion 3 and the tail portion 5 are coupled by actuators 23A to 23N respectively, and are adapted to be driven under the control of the electronic circuit housed in the main body portion 3.

As described above, the entertainment robot 1 moves like a real quadruped, by shaking the head portion 2 left, right, up or down, wagging the tail portion 5, and moving the foot portions 4A to 4D for walking or running by driving each of the actuators 23A to 23N.

(2) CIRCUIT CONFIGURATION OF AN ENTERTAINMENT ROBOT

Figure 2:
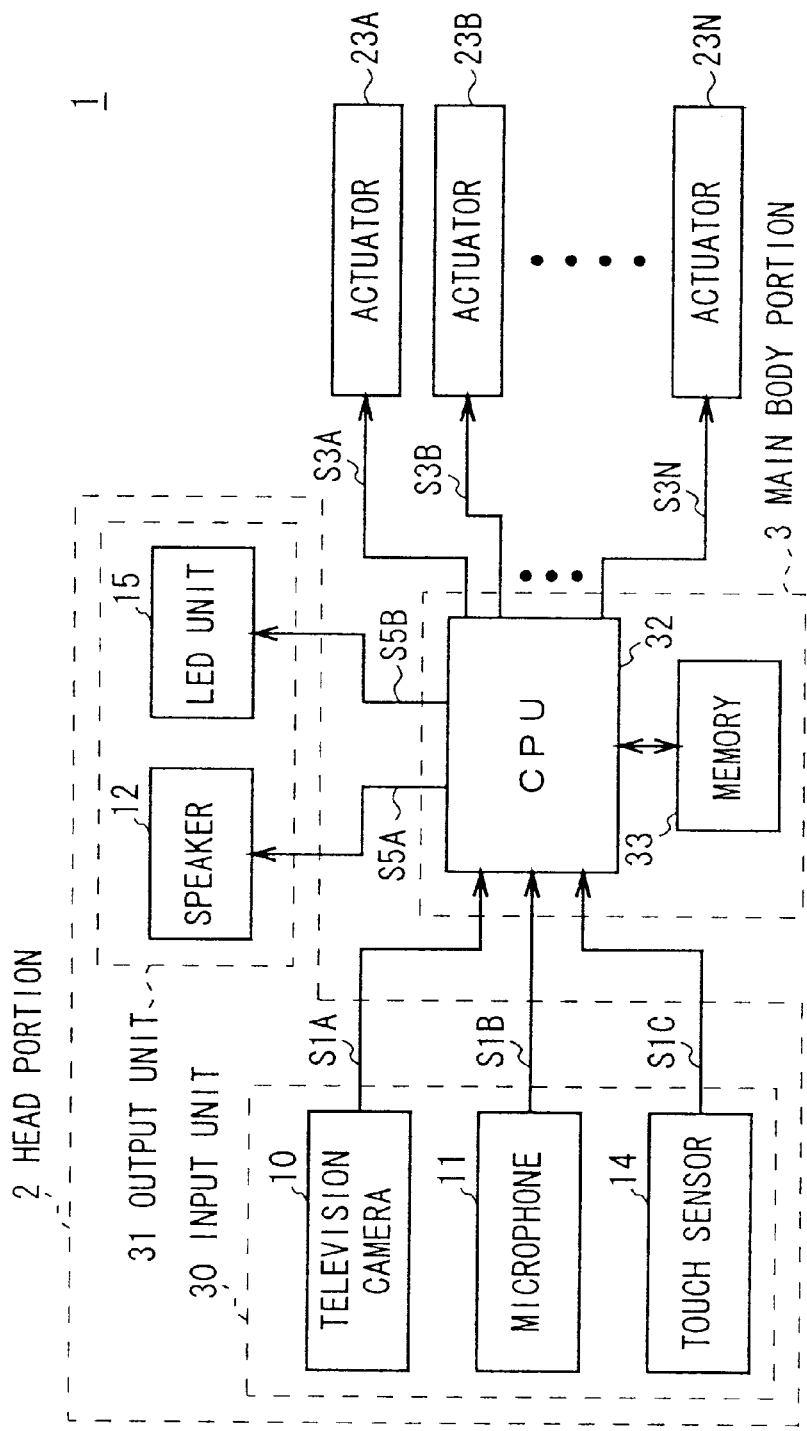
FIG. 2 is a block diagram showing circuit configuration of the entertainment robot.

With reference to FIG. 2, the description will be made of a circuit configuration of the entertainment robot 1. The head portion 2 has an input unit 30 comprising a television camera 10, a microphone 11 and a touch sensor 14; and an output unit 31 comprising a speaker 12 and an LED unit 15. Also, the main body portion 3 has a CPU (Central Processing Unit) 32 for controlling actions of the entire entertainment robot 1, and a memory 33 for storing various kinds of programs and the like. Further, the entertainment robot 1 is provided with the actuators 23A to 23N at predetermined positions.

The television camera 10 is used to detect movements of other entertainment robots and the surroundings of the entertainment robot 1 itself. It picks up blinking of LEDs provided for the other entertainment robots and images around the entertainment robot 1 itself, and transmits the resultant image signal S1A to the CPU 32.

The microphone 11 is used to detect voice given from the other entertainment robots and the operator. It collects the voice to generate an audio signal S1B, and transmits it to the CPU 32. The touch sensor 14 is used to detect an appeal of the operator to the entertainment robot 1. When the operator makes a desired appeal by touching the touch sensor 14, the touch sensor 14 transmits a contact-detection signal S1C corresponding to the appeal to the CPU 32.

An input signal S1 including such an image signal S1A, an audio signal S1B and a contact-detection signal S1C is composed of discrimination information (hereinafter, called "sender ID") of an entertainment robot, which is a sender of the input signal S1, discrimination information (hereinafter, called "receiver ID") of an entertainment robot, which is a transmission target of the input signal S1, and communication information to be communicated from a entertainment robot of a sender to an entertainment robot of a transmission target.

The memory 33 previously stores discrimination information allocated to the entertainment robot 1 and a plurality of entertainment robots other than the entertainment robot 1. The CPU 32 specifies the sender entertainment robot and the transmission target entertainment robot from the sender ID and receiver ID included in the input signal S1 to be inputted through the input unit 30 from the outside, on the basis of a list of discrimination information stored in the memory 33.

As a result, when it judges that a specified receiver ID is the own robot, the CPU 32 generates driving signals S3A to S3N in accordance with the communication information included in the input signal S1, and transmits these signals to the corresponding actuators 23A to 23N and drives them to thereby operate the entertainment robot 1.

The speaker 12 is used to communicate desired information to the other entertainment robots by giving voice. The LED unit 15 comprises an LED for radiating red light, an LED for radiating blue light, an LED for radiating green light, and an LED for radiating yellow light, and is adapted to notify the other entertainment robots of the desired information by blinking the LEDs.

Thus, the CPU 32 generates, as required, an output signal S5 comprising an audio signal S5A and a blinking signal S5B on the basis of an input signal S1 to be inputted through the input unit 30, and outputs, out of the output signal S5, the audio signal S1A outwardly through the speaker 31, or transmits the blinking signal S5B to the LED unit 15 to blink the LEDs constituting the LED unit 15, whereby the desired information is adapted to be communicated to other entertainment robots which are specified by the receiver ID.

(3) THE CASE WHERE A PLURALITY OF ENTERTAINMENT ROBOTS ARE USED IN A SOCCER GAME

The description will be made of data processing which the CPU 32 of each entertainment robot 1 performs in the case where a necessary number of entertainment robots 1 is prepared for playing soccer.

(3-1) Action Decision Process by CPU

Figure 3:
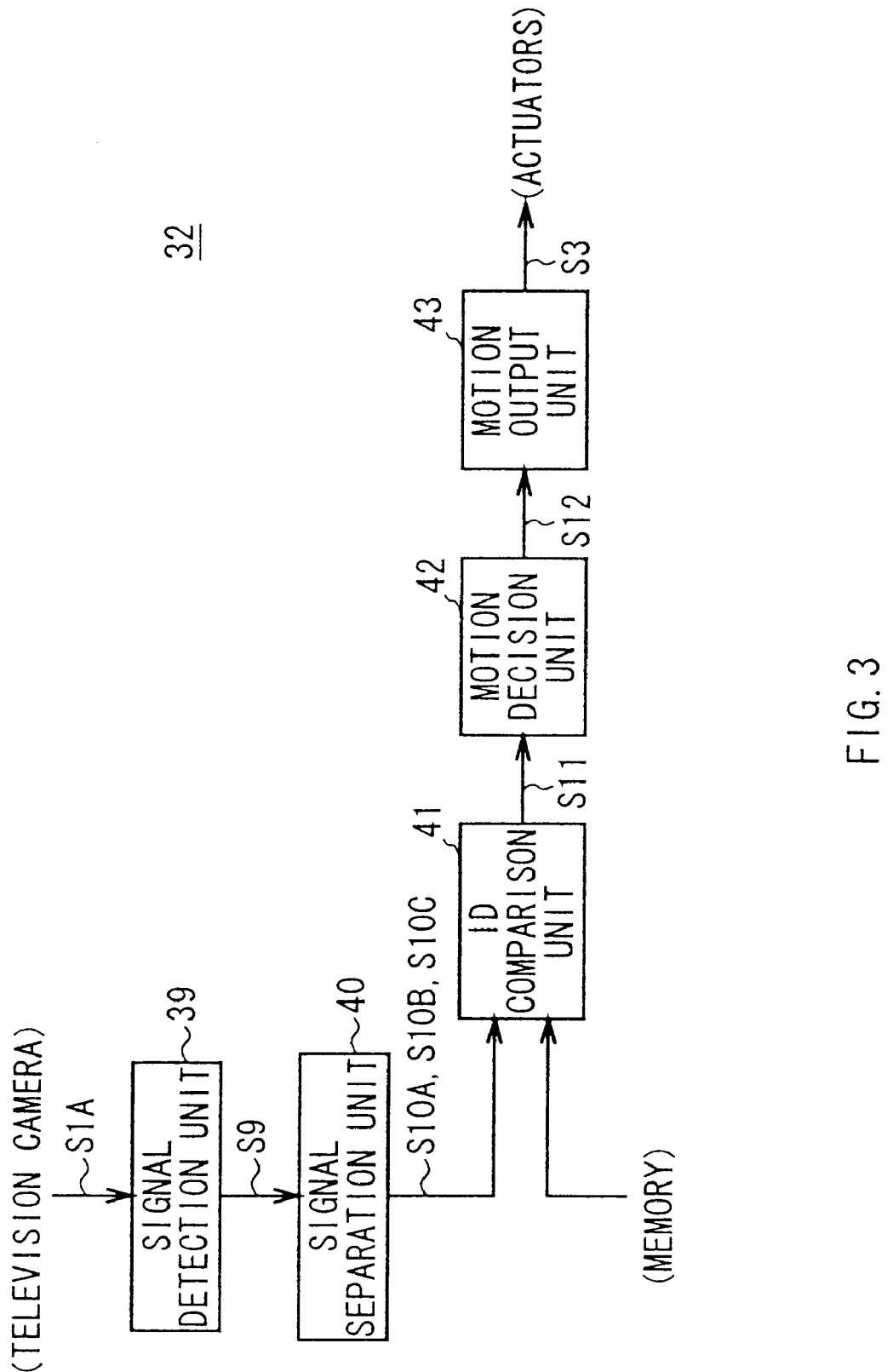
FIG. 3 is a block diagram explaining an action decision process by a CPU.

To begin with, with reference to FIG. 3, the description will be made of an action decision process which the CPU 32 of the entertainment robot 1B performs in the case where, for example, an entertainment robot 1A, out of a plurality of entertainment robots 1 is going to make a pass toward an entertainment robot 1B while dribbling.

At this time, the entertainment robot 1A, which is the sender, transmits the discrimination information of the entertainment robot 1A as the sender ID by blinking the red LED of the LEDs constituting the LED unit 15 (FIG. 2). The entertainment robot 1A transmits the discrimination information of the entertainment robot 1B as the receiver ID by blinking the blue LED, and transmits communication information indicating that the pass is to be made, by blinking the green LED.

The entertainment robot 1B picks up an image of the blinking state of the LEDs constituting the LED unit 15 (FIG. 2) of the entertainment robot 1A using the television camera 10 (FIG. 2), and inputs the resultant image signal S1A into a signal detection unit 39 of the CPU 32. The signal detection unit 39 detects transmitted information S9 indicating the blinking state of the LEDs constituting the LED unit 15 of the entertainment robot 1A, from the image signal S1A obtained using the television camera 10 to transmit this information to a signal separation unit 40. The signal separation unit 40 separates the transmitted information S9 into a sender ID S10A, a receiver ID S10B and communication information S10C to transmit them to an ID comparison unit 41.

The ID comparison unit 41 specifies the entertainment robot 1B indicated by the receiver ID S10B on the basis of the list of discrimination information on the entertainment robots 1 stored in the memory 33. As a result, the ID comparison unit 41 judges that the receiver ID S10B represents the entertainment robot 1B, and transmits this judge information and the communication information S10C to a motion decision unit 42 as comparison result information S11.

The motion decision unit 42 decides a next motion to be performed, on the basis of the comparison result information S11 indicating that its own robot is included in the receiver ID, and that the pass is made toward its own robot from the entertainment robot 1A, and transmits the resultant motion decision information S12 to a motion output unit 43.

The motion output unit 43 generates a driving signal S3 on the basis of the motion decision information S12, transmits the driving signal S3 to the actuators 23 to drive them, and thereby the entertainment robot 1B operates. In this respect, if it is judged by the ID comparison unit 41 that its own robot is not included in the receiver ID S10B, the motion decision unit 42 is adapted to decide the next motion on the basis of the fact that the communication information S10C is not for its own robot. As described above, the entertainment robot 1 is adapted to be able to decide and perform the next motion on the basis of information transmitted from the other entertainment robots.

Figure 4:
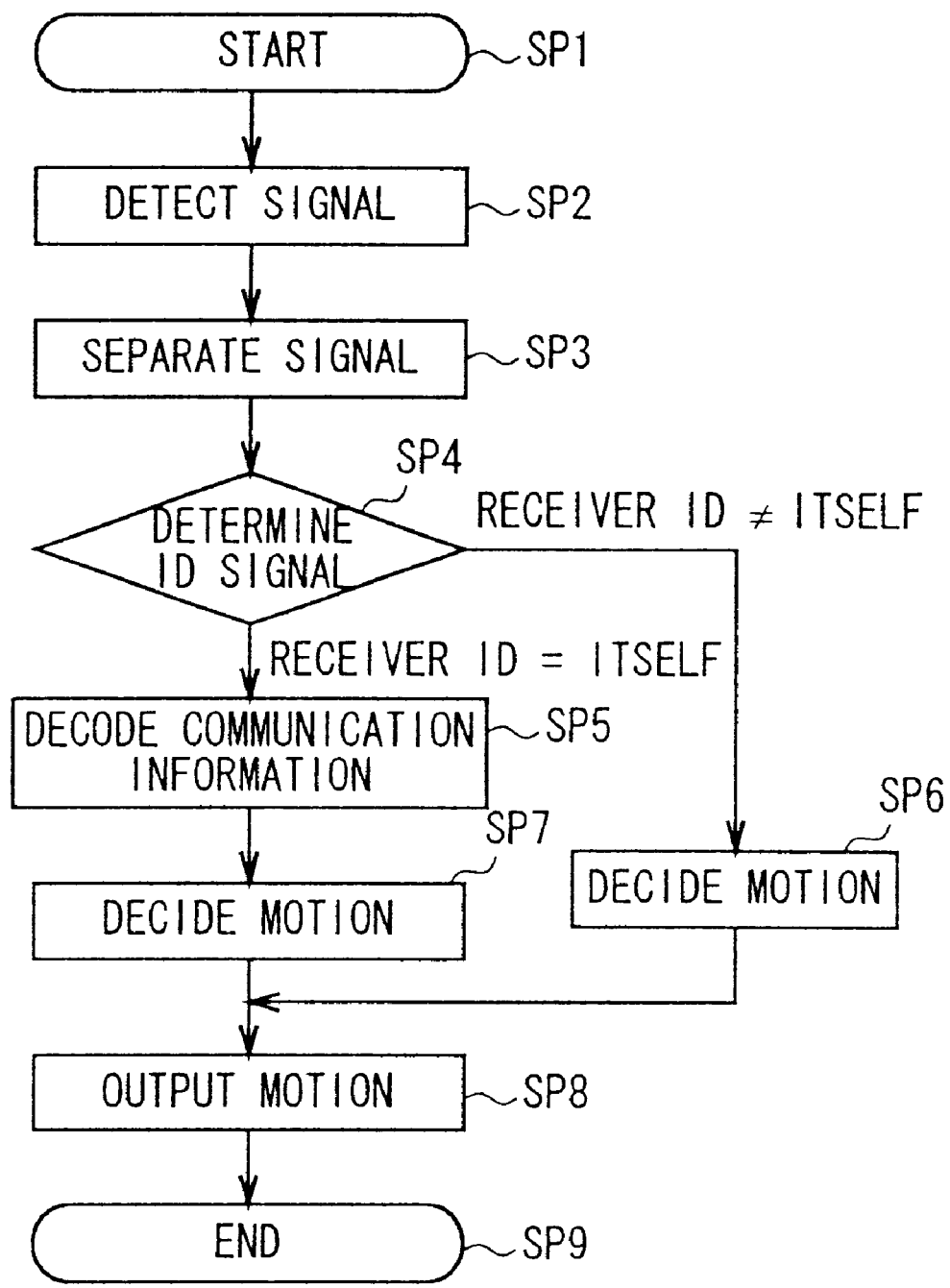
FIG. 4 is a flow chart showing an action decision procedure by the CPU.

Hereinafter, with reference to a flow chart shown in FIG. 4, the description will be made of an action decision procedure using such CPU 32. Starting with step SP1, in step SP2, the CPU 32 detects the transmitted information S9 transmitted from the entertainment robot 1A from the image signal S1A picked up by the television camera 10 (FIG. 2). Then, the process proceeds to step SP3 to separate the transmitted information S9 into the sender ID S10A, the receiver ID S10B and the communication information S10C.

In step SP4, the CPU 32 determines whether or not the receiver ID indicates its own robot, on the basis of the list of discrimination information on the entertainment robots 1 stored in the memory 33. As a result, if the receiver ID shows its own robot, the process proceeds to step SP5, and otherwise it proceeds to step SP6.

In step SP5, the CPU 32 decodes the communication information S10C, and the process proceeds to step SP7 to decide the next motion on the basis of the contents of the decoded communication information S10C. In step SP8, the CPU 32 drives the actuators 23 in accordance with the decided motion to operate the entertainment robot 1B, and thereafter, the process proceeds to step SP9 to terminate the processing.

On the other hand, in step SP4, if the receiver ID does not show its own robot, the CPU 32 proceeds to step SP6 to decide the next motion on the basis of the fact that the communication information S10C is not for its own robot. Then, in step SP8, the CPU 32 drives the actuators 23 in accordance with thus decided motion to operate the entertainment robot 1B, and thereafter, the process proceeds to step SP9 to terminate the processing.

(3-2) Positional Information Transmission Process Using CPU

Figure 5:
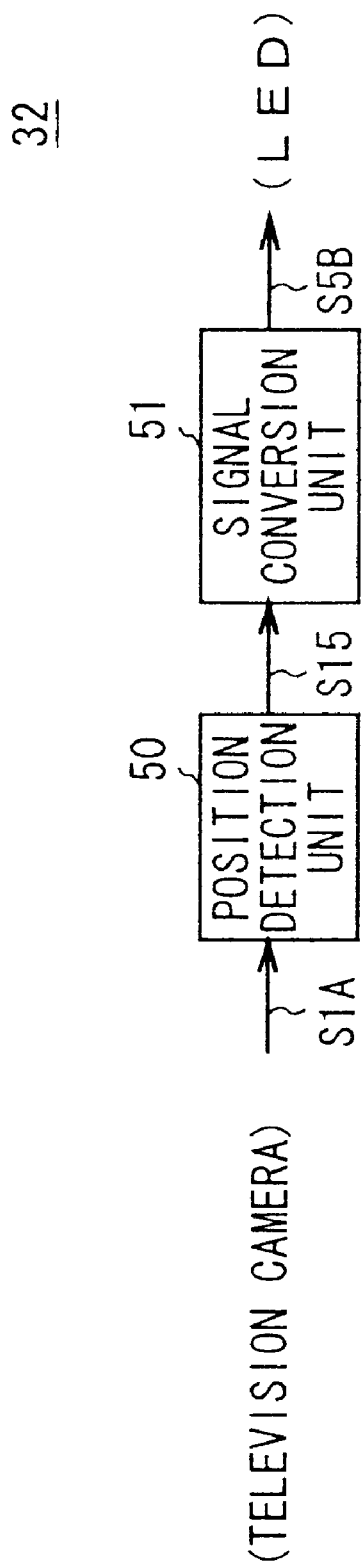
FIG. 5 is a block diagram explaining a positional information transmission process by the CPU.

With reference to FIG. 5, the description will be made of a positional information transmission process by the CPU 32 of the entertainment robot 1A in the case where the entertainment robot 1A notifies the entertainment robot 1B of its own present position. First, the CPU 32 of the entertainment robot 1A detects that his own position is, for example, at a distance of 1 meter from the enemy's goal and of 0.5 meter from the left end of the enemy's goal, on the basis of distance detection marks placed at predetermined positions on the ground, shown in an image based on an image signal S1A picked up by the television camera 10, and transmits this information indicating his own position to a signal conversion unit 51 as positional information S15.

On receipt of the positional information S15 from the position detection unit 50, the signal conversion unit 51 decides the receiver ID indicating the entertainment robot 1B, which is the transmission target, and on the basis of this decision, the sender ID, the receiver ID and the positional information S15 are synthesized to thereby generate transmitted information.

The signal conversion unit 51 allocates, out of this transmitted information, for example, the sender ID to a red LED, the receiver ID to a blue LED, a distance on the court in the longitudinal direction to a green LED, and a distance on the court in the lateral direction to a yellow LED, and converts the transmitted information into a blinking signal S5B for each LED. Thus, the signal conversion unit 51 transmits this blinking signal S5B to the LED unit 15 (FIG. 2) to blink the LEDs constituting the LED unit 15, whereby it is capable of notifying the entertainment robot 1B of his own position, and performing team play including a pass.

Figure 6:
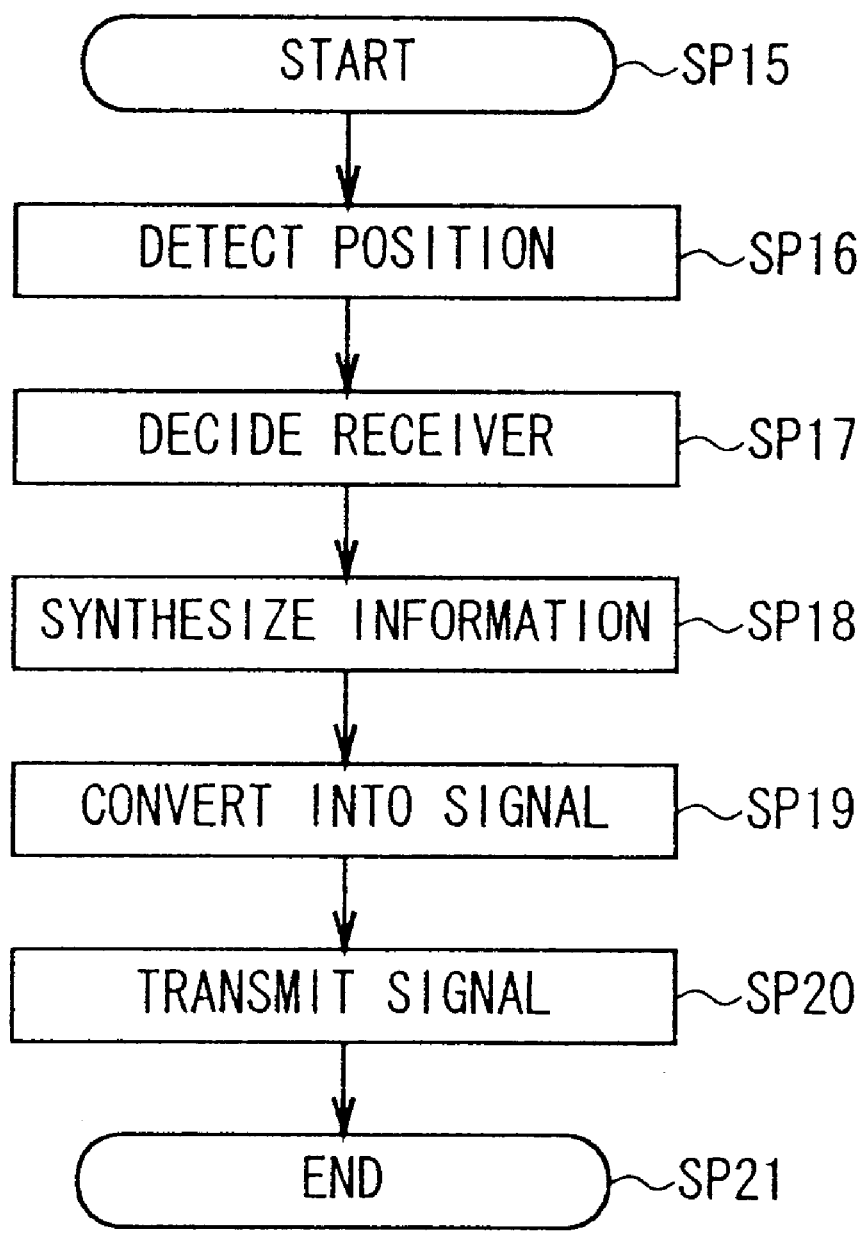
FIG. 6 is a flow chart showing the positional information transmission procedure by the CPU.

Hereinafter, with reference to the flow chart shown in FIG. 6, the description will be made of positional information transmitting procedure using the CPU 32. Starting with step SP15, in step SP16, the CPU 32 detects positional information S15 indicating his own position on the basis of an image of an image signal S1A picked up by the television camera 10. In step SP17, the CPU 32 decides the entertainment robot 1B, which is the transmission target, and proceeds to step SP18 to generate transmitted information to be transmitted to the entertainment robot 1B by synthesizing the sender ID, the receiver ID and positional information S15.

In step SP19, the CPU 32 converts this transmitted information into a blinking signal S5B for transmitting through the LEDs constituting the LED unit 15, and in step SP20, blinks each LED on the basis of this blinking signal S5B, and thereafter, proceeds to step SP21 to terminate the processing.

(3-3) Positional Information Receiving Process by CPU

Figure 7:
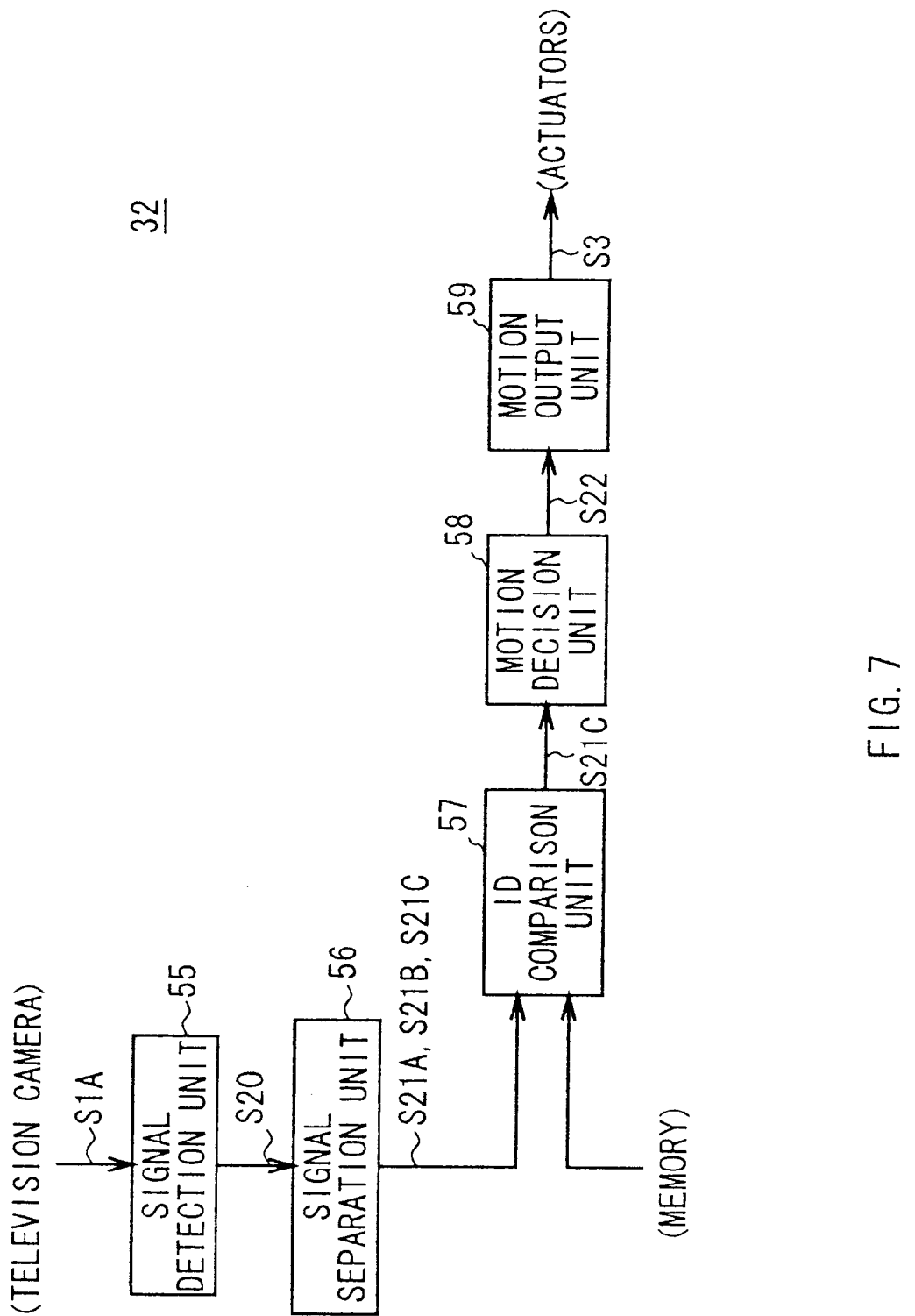
FIG. 7 is a block diagram explaining a positional information receiving process by the CPU.

With reference to FIG. 7, the description will be made of a positional information receiving process by the CPU 32 of the entertainment robot 1A in the case where the entertainment robot 1A carrying a ball decides a receiver of the pass on the basis of positional information transmitted from the entertainment robots 1B and 1C.

The entertainment robot 1A picks up an image of the blinking state of the LED units 15 of each entertainment robot 1B and 1C using the television camera 10 (FIG. 2), and inputs the resultant image signals S1A into the signal-detection unit 55 in the CPU 32. The signal detection unit 55 detects transmitted information S20 indicating the blinking state of the LED unit 15 of each entertainment robot 1B and 1C, from the image signals S1A obtained using the television camera 10 to transmit this information to a signal separation unit 56. The signal separation unit 56 separates the transmitted information S20 from each entertainment robot 1B and 1C into the sender ID S21A, the receiver ID S21B and the positional information S21C to transmit them to an ID comparison unit 57.

The ID comparison unit 57 specifies the entertainment robot 1 indicated by the receiver ID S21B, which has been transmitted from each of the entertainment robots 1B and 1C, on the basis of the list of discrimination information on the entertainment robots 1 stored in the memory 33. As a result, if its own robot is included in the receiver ID S21B, it transmits respective positional information S21C of the entertainment robots 1B and 1C to a motion decision unit 58.

The motion decision unit 58 retains the present motion of the entertainment robot 1A itself indicating, for example, that "it is now carrying a ball and is going to make a pass", the internal state, and its own present position, decides a receiver of the pass out of the entertainment robots 1B and 1C on the basis of the present motion and internal state, the respective present positions of the entertainment robots 1B and 1C, and its own present position, and transmits the resultant motion decision information S22 to the motion output unit 59.

The motion output unit 59 generates a driving signal S3 on the basis of the motion decision information S22, transmits the driving signal S3 to the actuators 23, and drives the actuators 23 to thereby make the pass toward the desired entertainment robot 1. As described above, the entertainment robot 1 is adapted to be able to decide and perform the next motion on the basis of positional information to be given from other entertainment robots.

Figure 8:
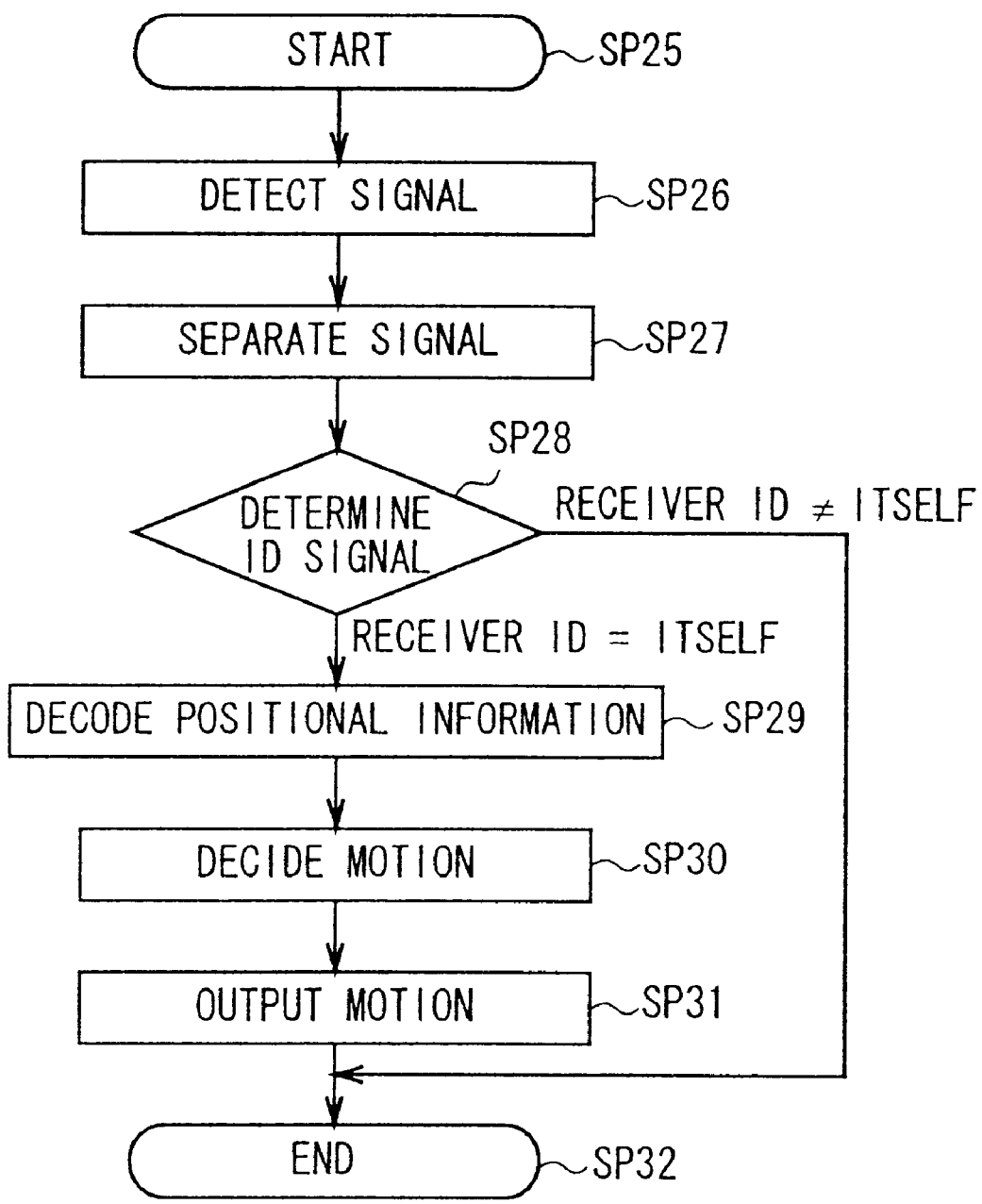
FIG. 8 is a flow chart showing a positional information receiving procedure by the CPU.

Hereinafter, with reference to a flow chart shown in FIG. 8, the description will be made of a positional information receiving procedure by the CPU 32. Starting with step SP25, in step SP26, the CPU 32 of the entertainment robot 1A detects transmitted information S20 showing the blinking state of the LED units 15 in each entertainment robots 1B and IC from the image signal S1A obtained by the television camera 10. Then, in step SP27, the CPU 32 separates the transmitted information S20 of each entertainment robot 1B and 1C into the sender ID S21A, the receiver ID S21B and the positional information S21C.

In step SP28, the CPU 32 specifies an entertainment robot indicated by a receiver ID S21B, which has been transmitted from each of the entertainment robots 1B and 1C on the basis of the list of discrimination information on the entertainment robots 1 stored in the memory 33. As a result, if its own robot is included in the receiver ID S21B, the process proceeds to step SP29 to decode the respective positional information S21C of each entertainment robot 1B and 1C.

Next, in step SP30, on the basis of the present motion and internal state of the entertainment robot 1A itself, the respective present positions of the entertainment robots 1B and 1C, and its own present position, the CPU 32 decides a receiver of the pass out of the entertainment robots 1B and 1C, and proceeds to step SP31 to drive the actuators 23 so as to make the pass toward thus decided receiver, and thereafter proceeds to step SP32 to terminate the processing. On the other hand, in step SP28, if the receiver ID does not indicate its own robot, the CPU 32 proceeds to step SP32 to terminate the processing.

(3-4) Number Information Transmission Process by CPU

Figure 9:
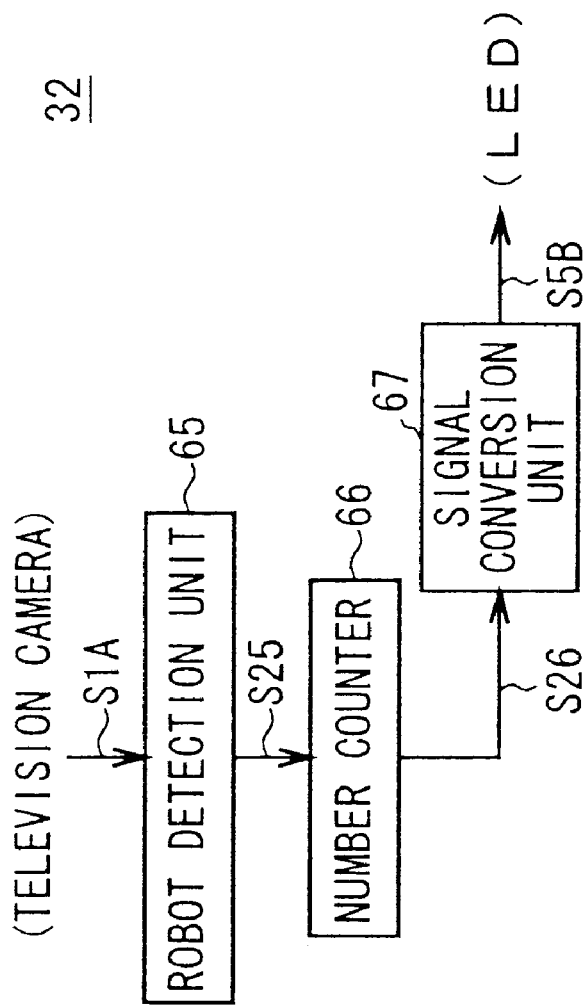
FIG. 9 is a block diagram explaining a number information transmission process by the CPU.

With reference to FIG. 9, the description will be made of a number information transmission process by the CPU 32 of the entertainment robot 1A in the case where for example, the entertainment robot 1A counts the number of the entertainment robots 1 existing around the entertainment robot 1A to notify the other entertainment robots 1 of the number.

The entertainment robot 1A picks up images of the blinking state of the LEDs of entertainment robots 1 existing within his own detectable range using the television camera 10, and inputs the resultant image signal S1A into a robot detection unit 65 of the CPU 32. The robot detection unit 65 detects transmitted information showing the blinking state of the LEDs of the entertainment robots 1, and thereafter, extracts the sender ID from the transmitted information.

The robot detection unit 65 recognizes a solid of the entertainment robot 1 on the basis of this sender ID, discriminates whether the entertainment robot 1 thus recognized belongs to the friend team or the enemy team, and transmits a robot detection signal S25 showing the discrimination result to a number counter 66 every time it recognizes the entertainment robot 1.

The number counter 66 counts the number of robots of the friend team and of the enemy team every time the robot detection signal S25 is supplied, and transmits the resultant number information S26 to a signal conversion unit 67. The signal conversion unit 67 decides a receiver ID indicating the entertainment robot 1 which is the transmission target, and thereafter, generates transmitted information by synthesizing the sender ID, the receiver ID and the number information.

The signal conversion unit 67 generates a blinking signal S5B corresponding to this transmitted information, transmits this signal to the LED unit 15, and blinks each LED to thereby notify the other entertainment robots 1 of the number of the entertainment robots 1 existing around its own robot. In a case where two entertainment robots 1 of the enemy team exist around the entertainment robot 1A, the signal conversion unit 67 transmits such information corresponding to the number information that "since there are many entertainment robots 1 of the enemy team in the vicinity, do no make a pass toward me" in addition to the number information.

Figure 10:
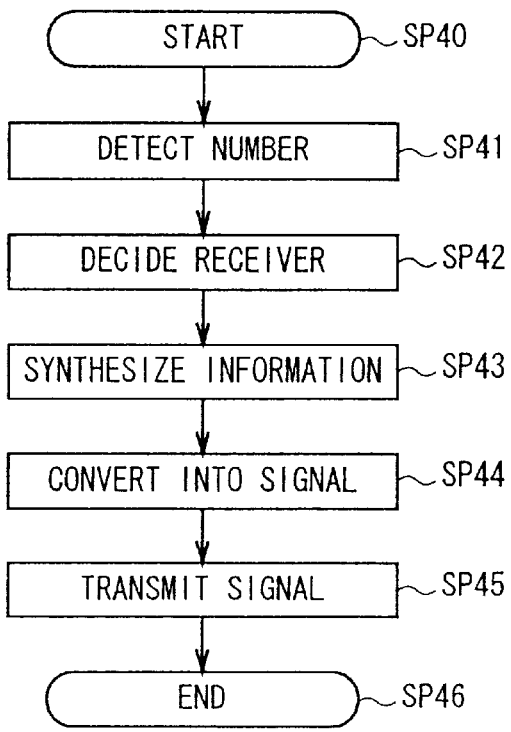
FIG. 10 is a flow chart showing a number information transmission procedure by the CPU.

Hereinafter, with reference to a flow chart shown in FIG. 10, the description will be made of a number information transmitting procedure using such CPU 32. Start with step SP40, in step SP41, the CPU 32 counts the numbers of entertainment robots 1 of the friend team and of the enemy team existing around its own robot on the basis of image signals S1A picked up by the television camera 10. In step SP42, the CPU 32 selects the receiver ID, and thereafter, proceeds to step SP43 to generate transmitted information by synthesizing the sender ID, the receiver ID and the number information.

In step SP44, the CPU 32 converts this transmitted information into a blinking signal S5B, proceeds to step SP45, transmits the blinking signal S5B to the LED unit 15, and blinks the LEDs to thereby notify the other entertainment robots 1 of a number of entertainment robots 1 existing around its own robot. Then, the process proceeds to step SP46 to terminate the processing.

(3-5) Number Information Receiving Process Using CPU

Figure 11:
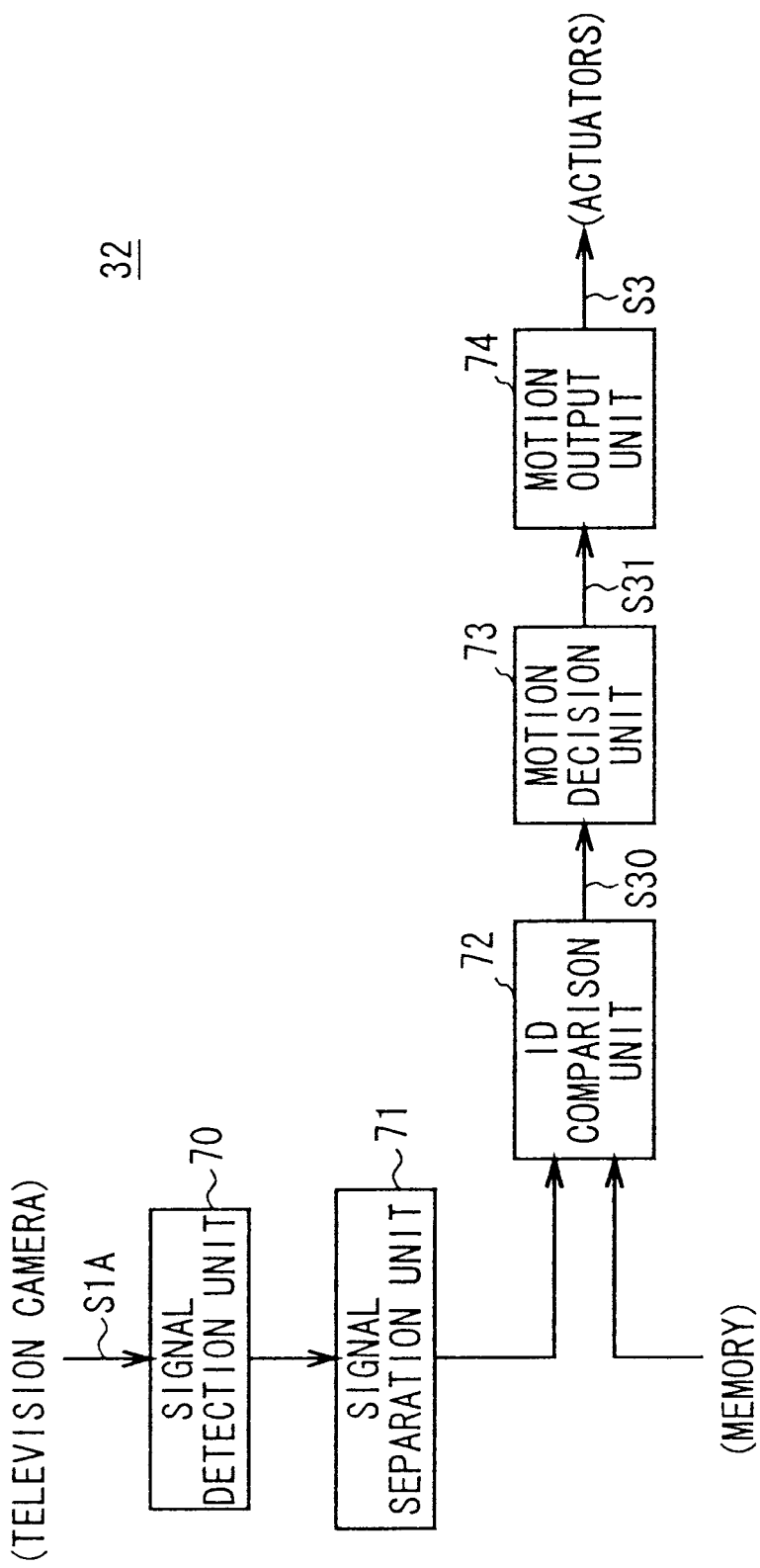
FIG. 11 is a block diagram explaining a number information receiving process by the CPU.

With reference to FIG. 11, the description will be made of a number information receiving process by the CPU 32 of the entertainment robot 1A in a case where the entertainment robot 1A decides a receiver of the pass on the basis of the number information transmitted from the entertainment robots 1B and 1C in a state where the entertainment robot 1A is carrying a ball.

The entertainment robot 1A picks up images of the blinking state of the LED units 15 of the entertainment robots 1B and 1C using the television camera 10, and inputs the resultant image signals S1A into the signal detection unit 70 in the CPU 32. The CPU 32 inputs, into a motion decision unit 73, number information S30 indicating the number of entertainment robots 1 of the enemy team, which exist around each of the entertainment robots 1B and 1C, obtained through a signal detection unit 70, a signal separation unit 71 and an ID comparison unit 72 sequentially.

A motion decision unit 73 retains the present motion and internal state indicating, for example, that "it is now carrying a ball and is going to make a pass", and decides a receiver of the pass out of the entertainment robots 1B and 1C, on the basis of the present motion and internal state, and the number of the entertainment robots 1 of the enemy team existing in the vicinity of the entertainment robots 1B and 1C to thereby generate motion decision information S31 which is then transmitted to a motion output unit 74.

A motion output unit 74 generates a driving signal S3 on the basis of the motion decision information S31; transmits the driving signal S3 to the actuators 23, and drives the actuators 23 to thereby make the pass toward the entertainment robot 1 decided. As described above, the entertainment robot 1 is adapted to be able to decide the next motion on the basis of number information to be transmitted from other entertainment robots 1.

Figure 12:
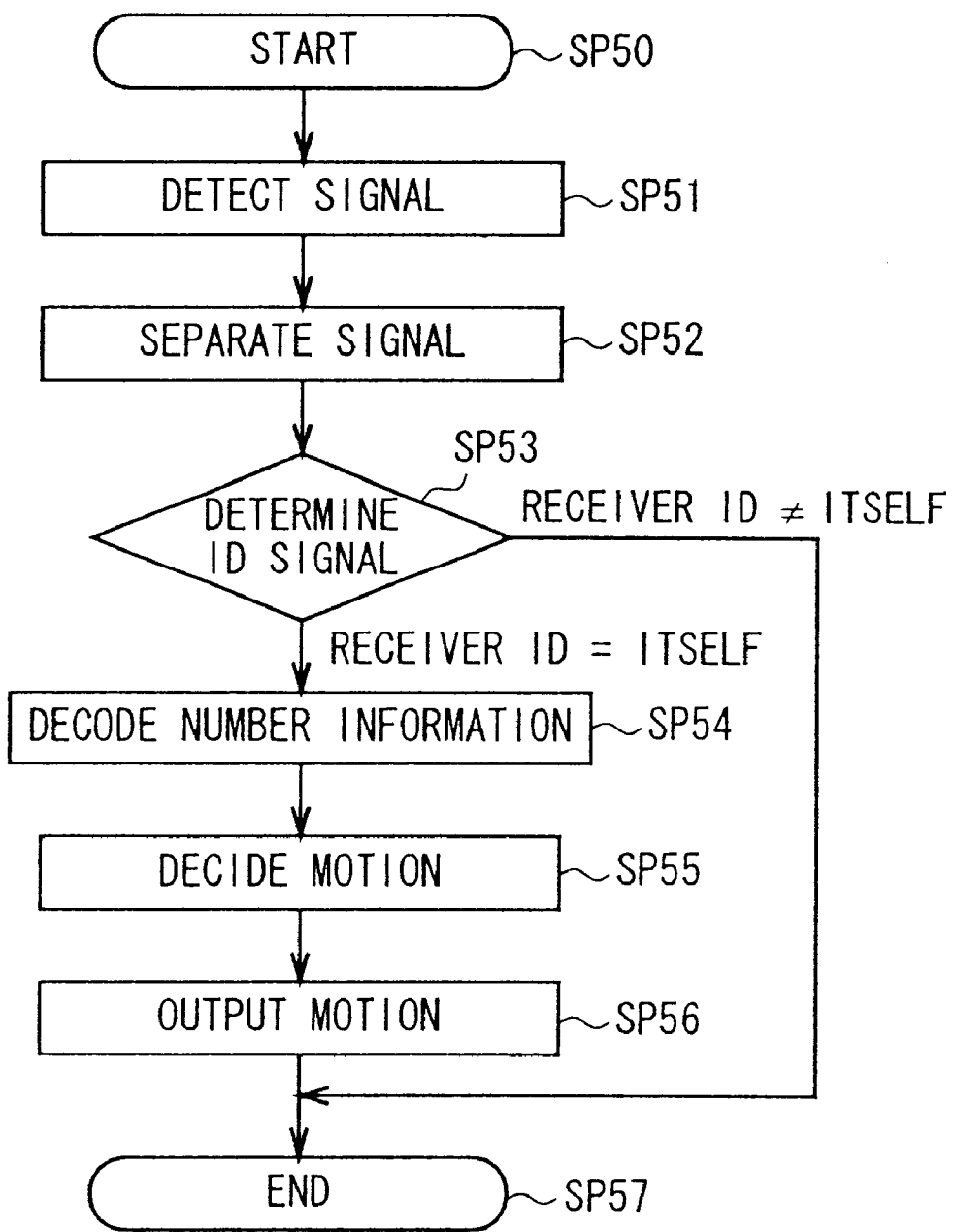
FIG. 12 is a flow chart showing a number information receiving procedure by the CPU.
Figure 13:
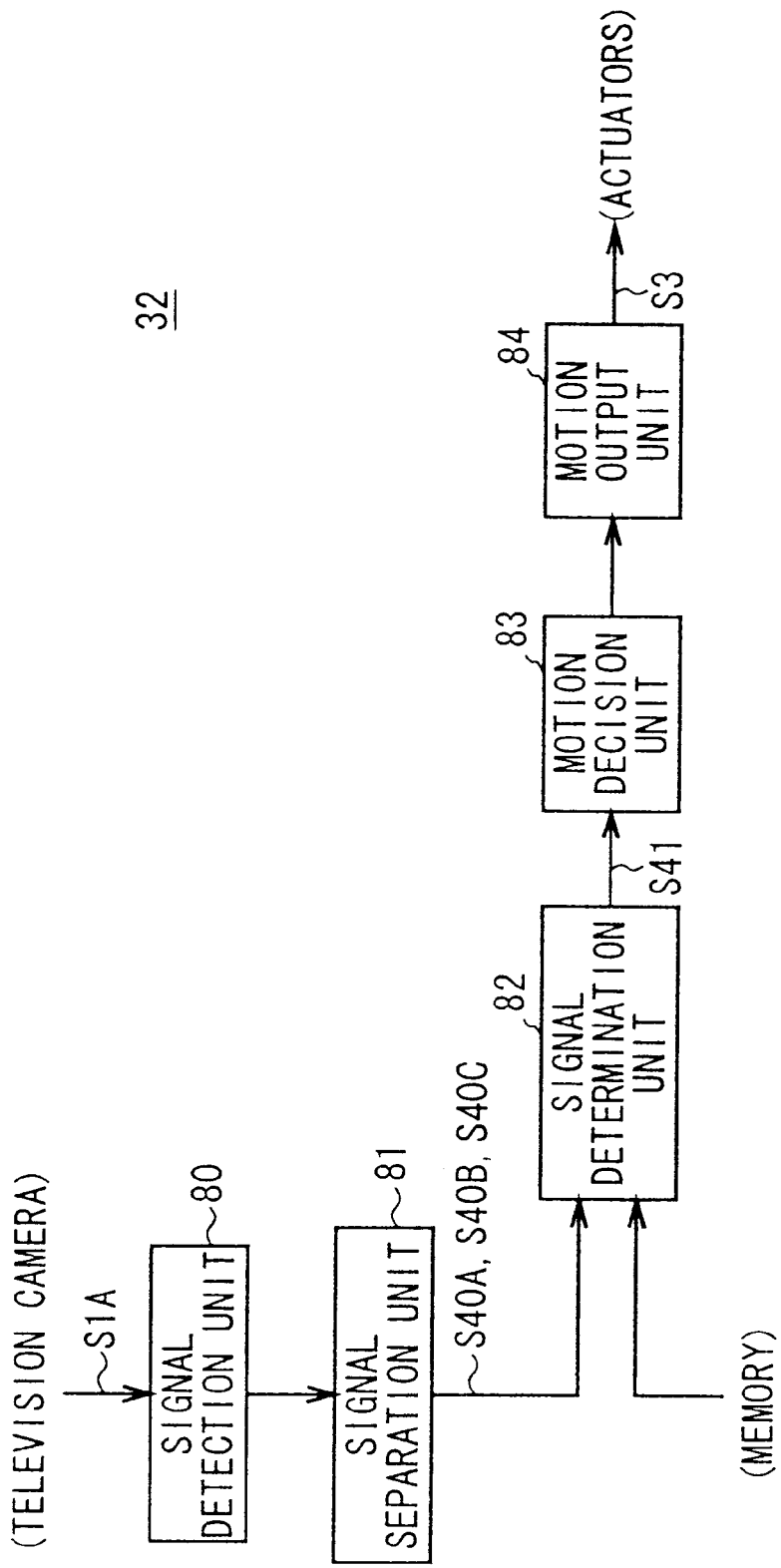
FIG. 13 is a block diagram explaining a motion decision process by the CPU when the transmitter is a leader.

Hereinafter, with reference to a flow chart shown in FIG. 12, the description will be made of a number information receiving procedure using the CPU 32. Starting with step SP50, in step SP51, the CPU 32 of the entertainment robot 1A detects transmitted information including the blinking state of the LED unit 15 in each entertainment robot 1B and 1C from the image signal S1A obtained by the television camera 10. Then, in step SP52, the CPU 32 separates the transmitted information of each entertainment robot 1B and 1C into the sender ID, the receiver ID and the number information.

In step SP53, the CPU 32 specifies the entertainment robot 1 indicated by the receiver ID, which has been transmitted from each of the entertainment robots 1B and 1C, on the basis of the list of discrimination information on the entertainment robots 1 stored in the memory 33. As a result, if its own robot is included in the receiver ID, the process proceeds to step SP54 to decode number information S30 from each of the entertainment robots 1B and 1C.

Next, in step SP55, on the basis of the present motion and internal state of the entertainment robot 1A itself, and the number information from each of the entertainment robots 1B and 1C, the CPU 32 decides a receiver of the pass out of the entertainment robots 1B and 1C, and proceeds to step SP56 to drive the actuators 23 so as to make the pass toward thus decided receiver, and thereafter proceeds to step SP57 to terminate the processing. On the other hand, in step SP53, if the receiver ID does not indicate its own robot, the CPU 32 proceeds to step SPS7 to terminate the processing.

(3-6) Motion Decision Process by CPU When a Sender is a Leader

First, for example, one entertainment robot 1 which becomes a leader is selected from among entertainment robots 1 constituting a friend team, and discrimination information of the leader entertainment robot 1 is stored in the memories 33 of the other entertainment robots 1 as an leader ID in advance. The leader entertainment robot 1 is adapted to be always located at positions that offer a broad view of the ground to monitor entirely. Also, the entertainment robots 1 have normally been set to carry a ball to the enemy's goal once it catches the ball.

Under this situation, in the case where the ball has been taken by an entertainment robot 1 of the enemy team, when the entertainment robot 1 selected as the leader detects through the television camera 10 that the ball has been taken by the enemy team, it transmits communication information indicating such an instruction that, for example, "All the friend members gather near the goal", to each entertainment robot 1 of the friend team through the LED unit 15, together with the leader ID and the receiver ID.

The entertainment robot 1 picks up images of the blinking state of the LED units 15 of the entertainment robots 1 existing within a detectable range using the television camera 10, and transmits the resultant image signal S1A into a signal detection unit 80 of the CPU 32. The CPU 32 inputs, into a signal determination unit 82, the sender ID S40A and receiver ID S40B of each entertainment robot 1 included in the image signal S1A, and communication information S40C through a signal detection unit 80 and a signal separation unit 81.

In the case where it judges, on the basis of the list of discrimination information on the entertainment robots 1 stored in the memory 33, that the sender ID shows discrimination information of the leader and that its own robot is included in the receiver ID corresponding to the sender ID, the signal determination unit 82 transmits communication information S40C corresponding to these sender ID and receiver ID to a motion decision unit 83 as instruction information S41 in preference to communication information S40C of other senders ID.

The motion decision unit 83 retains the present motion and internal state of the entertainment robot 1 itself, decides the next motion on the basis of the present motion and internal state, and instruction information S41 from the leader, thereafter, transmits a driving signal S3 to the actuators 23 through a motion output unit 84, and drives the actuators 23 to thereby perform such an action as to, for example, "return to the vicinity of the friend goal". By the way, if there is no discrimination information of the leader in the sender ID, the motion decision unit 83 decides the motion on the basis of the other communication information S40C. Thus, each entertainment robot 1 belonging to the same team is adapted to be able to perform team play in accordance with an instruction from the leader.

Figure 14:
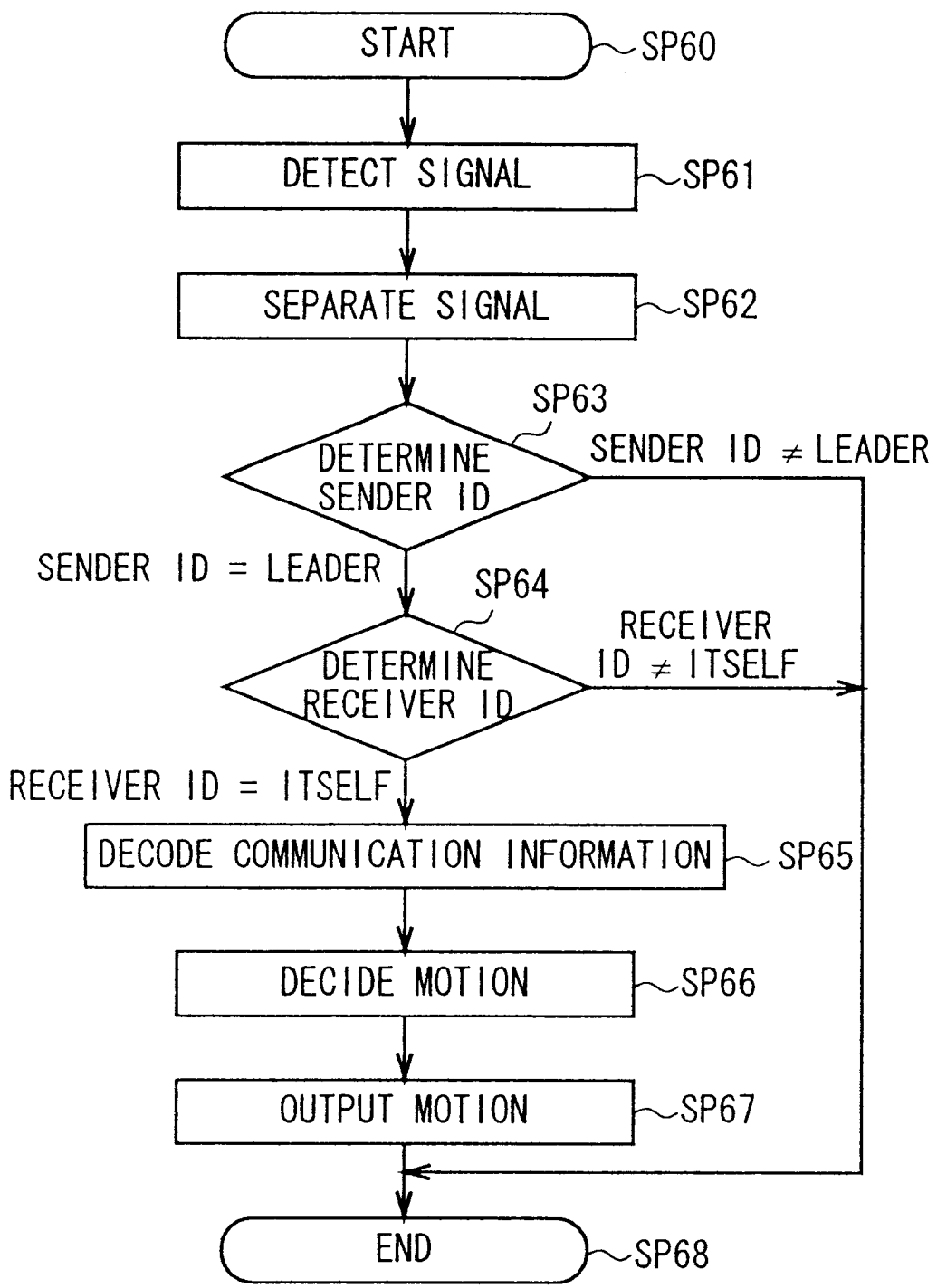
FIG. 14 is a flow chart showing a motion decision procedure by the CPU when the transmitter is a leader.

Hereinafter, with reference to a flow chart shown in FIG. 14, the description will be made of a motion decision procedure using CPU 32 when the sender is the leader. Starting with SP60, in step SP61, the CPU 32 in the entertainment robot 1 detects transmitted information showing the blinking state of the LED units 15 of each of the entertainment robots 1 existing within a detectable range from the image signal S1A obtained by the television camera 10.

In step SP62, the CPU 32 separates transmitted information of each entertainment robot 1 into the sender ID, the receiver ID and the communication information. In step SP63, on the basis of the list of discrimination information on the entertainment robots 1 stored in the memory 33, the CPU 32 determines whether or not there exists the discrimination information of the leader in the sender IDs which have been transmitted from the entertainment robots 1, and as a result, if there exists the discrimination information of the leader in the sender IDs, the process proceeds to step SP64.

In this step SP64, the CPU 32 determines whether or not its own robot is included in the receiver ID corresponding to the sender ID equal to the leader, and as a result, if its own robot is included in the receiver ID corresponding to the sender ID equal to the leader, the process proceeds to step SP65 to decode instruction information S41 corresponding to these sender ID and receiver ID.

Next, in step SP66, on the basis of the present motion and internal state of the entertainment robot 1 itself, and instruction information S41 from the leader, the CPU 32 decides the next motion, proceeds to step SP67, drives the actuators 23 in accordance with the motion thus decided, and thereafter, proceeds to step SP68 to terminate the processing. In this respect, if the CPU 32 judges in step SP63 that any sender ID does not show to the leader, the process proceeds to step SP68 to terminate the processing. Also, if the CPU 32 judges in step SP64 that its own robot is not included in the receiver ID, the process also proceeds to step SP68 to terminate the processing.

Figure 15:
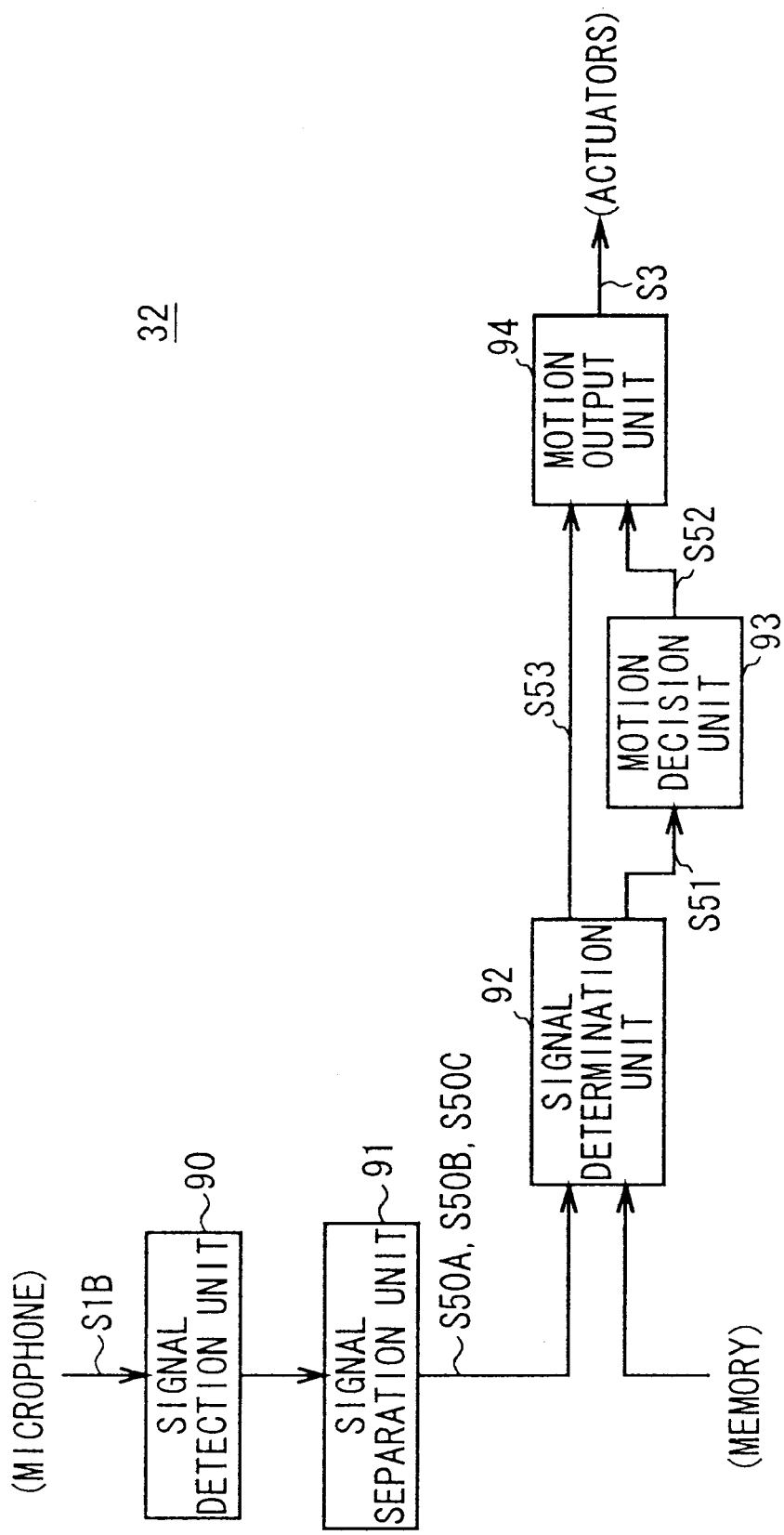
FIG. 15 is a block diagram explaining a motion output process in synchronism with a timing signal.

(3-7) Motion Output Process by CPU When Operating in Synchronism With a Timing Signal With reference to FIG. 15, the description will be made of a motion output process by the CPU 32 of the entertainment robots 1 in the case when for example, a plurality of the entertainment robots 1 are caused to march together to predetermined rhythm. When the entertainment robot 1, a metronome or the like, which is a sender, gives voice corresponding to transmitted information obtained by adding the sender ID and the receiver ID to communication information indicating contents of instruction to cause a motion such as, for example, a march to be performed in synchronism with a predetermined timing signal, each entertainment robot 1 to be controlled collects this voice through the microphone 11, and inputs the resultant audio signal S1B into a signal detection unit 90 in the CPU 32.

The CPU 32 inputs, into a signal determination unit 92, a sender ID S50A, a receiver ID S50B and communication information S50C, obtained through the signal detection unit 90 and a signal separation unit 91 sequentially. The signal determination unit 92 judges, on the basis of the discrimination information of the entertainment robots 1 stored in the memory 33, whether or not its own robot is included in the receiver ID, and as a result, if its own robot is included in the receiver ID, communication information S50C is transmitted to a motion decision unit 93 as motion information S51.

The motion decision unit 93 retains the present motion and internal state of the entertainment robot 1 itself, decides the next motion on the basis of the present motion and internal state, and the motion information S51 to thereby generate such motion decision information S52 as to, for example, "put the right front foot and left rear foot forward at the same time" for transmitting this information to a motion output unit 94.

Under this situation, when a timing signal S53 is inputted from the microphone 11 through the signal detection unit 90, the signal separation unit 91 and the signal determination unit 92 sequentially, the motion output unit 94 generates a driving signal S3, transmits the driving signal S3 to the actuators 23, and drives the actuators 23 to thereby cause the entertainment robots 1 to march in synchronism with the inputted timing signal S53. As described above, the plurality of entertainment robots 1 are adapted to be able to perform the same motion in synchronism with a timing signal to be supplied from a predetermined entertainment robot 1.

Figure 16:
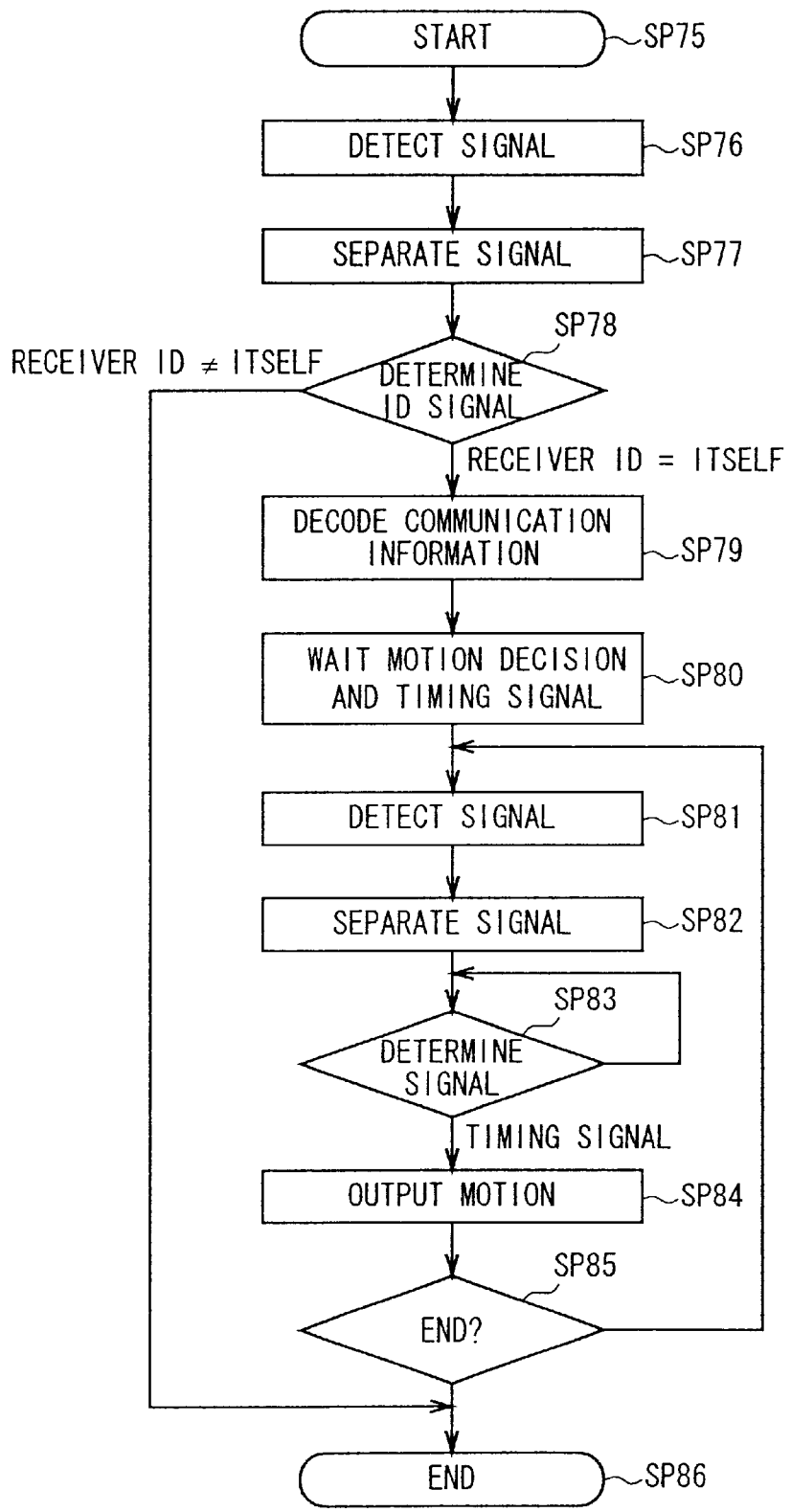
FIG. 16 is a flow chart showing a motion output procedure in synchronism with a timing signal.

Hereinafter, with reference to a flow chart shown in FIG. 16, the description will be made of a motion output procedure in synchronism with a timing signal by the CPU 32. Starting with step SP75, in step SP76, when it obtains an audio signal S1B given through the microphone 11 from the speaker 12 of the entertainment robot 1, which is the sender, the CPU 32 of the entertainment robot 1 detects transmitted information from the audio signal S1B.

In step SP77, the CPU 32 separates the transmitted information detected into a sender ID S50A, a receiver ID S50B and communication information S50C. Next, in step SP78, on the basis of the list of discrimination information on the entertainment robots 1 stored in the memory 33, the CPU 32 judges whether or not its own robot is included in the receiver ID, and as a result, if its own robot is included in the receiver ID, the process proceeds to step SP79 to decode the motion information S51 being the communication information S50C.

In the following step SP80, the CPU 32 decides the next motion on the basis of the present motion and internal state, and the motion information S51, and thereafter, stands ready until a timing signal is inputted. When it detects that transmitted information has been inputted through the microphone 11 in step SP81, the CPU 32 proceeds to step SP82 to separate the transmitted information detected into the sender IDS50A, the receiver IDS50B and the communication information S50C.

In step SP83, the CPU 32 determines whether or not a timing signal is included in the communication information S50C, and as a result, if a timing signal S53 is included, the process proceeds to step SP84 to move in synchronism with the inputted timing signal S53. On the other hand, in step SP83, if no timing signal is included in the communication information S50C, the CPU 32 stands ready until the timing signal is supplied.

In step SP85, the CPU 32 judges whether or not the communication information S50C indicating the end of the timing signal has been detected, and as a result, if the communication information S50C indicating the end of the timing signal has been detected, the process proceeds to step SP86 to terminate the processing, and if it has not been detected, the process proceeds to step SP81 to repeat the movements. By the way, in step SP78, if its own robot is not included in the receiver ID, the CPU 32 proceeds to step SP86 to terminate the processing.

(3-8) Motion Decision Process Corresponding to Role in a Group by CPU 32

Figure 17:
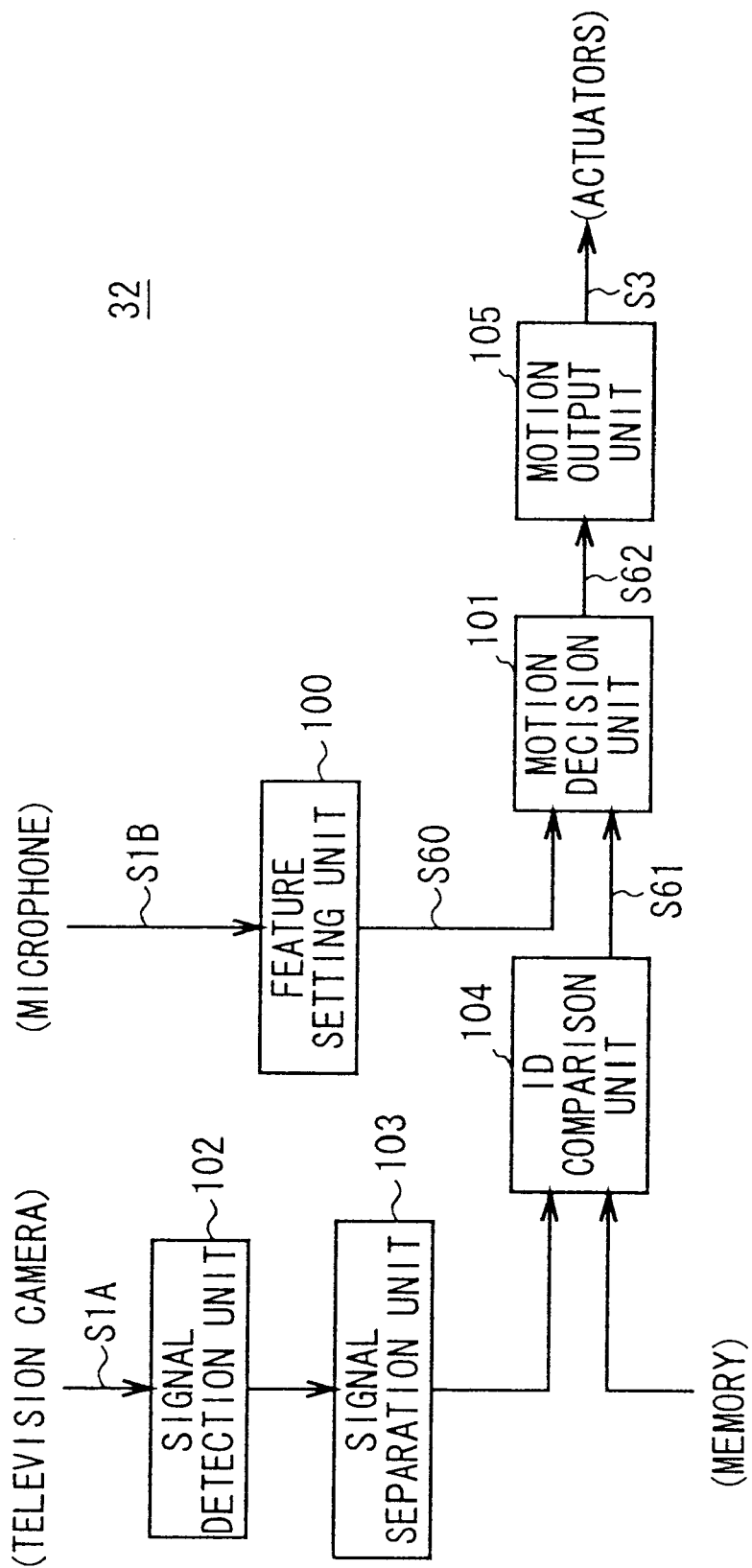
FIG. 17 is a block diagram explaining a motion decision process by the CPU, corresponding to a role in a group.

With reference to FIG. 17, the description will be made of a motion decision process by the CPU 32 of each entertainment robot 1 in the case where for example, a necessary number of the entertainment robots 1 is prepared to construct imaginary family relationship. In this case, the operator inputs a role in a group of, for example, father and mother or the like at a position in a family, and audio signals S1B designating feelings and action pattern, for example, a stubborn, kind, into a feature setting unit 100 of the CPU 32 through the microphone 11 of each entertainment robot 1.

The feature setting unit 100 send the feature setting information S60 to a motion decision unit 101 to change the internal setting, so that the entertainment robot 1 creates movements according to the specified role in the group, feelings, and the action pattern.

The CPU 32 obtains communication information S61 by sequentially passing an image signal S1A picked up by the television camera 10 through a signal detection unit 102, a signal separation unit 103 and an ID comparison unit 104 and inputs it into the motion decision unit 101.

The motion decision unit 101 decides the next motion in accordance with the internal setting, which has been changed by the feature setting unit 100, on the basis of the communication information S61 which is given from the ID comparison unit 104, and transmits the resultant motion decision information S62 to a motion output unit 105.

The motion output unit 105 generates a driving signal S3 from the motion decision information S62 to drive the actuators 23 in desired movements. Thus, relationship similar to human family relationship can be constructed with the plurality of entertainment robots 1.

Figure 18:
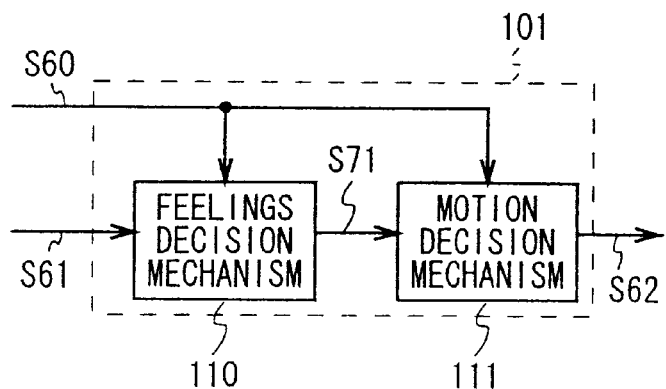
FIG. 18 is a block diagram showing the configuration of a motion decision unit.

Note that, the concrete configuration of the motion decision unit 101 will be shown in FIG. 18. As can be seen from FIG. 18, the motion decision unit 101 consists of a feelings decision mechanism 110 for deciding feelings of the entertainment robot 1 and a motion decision mechanism 111 for deciding a next movement of the entertainment robot 1 taking the decided feelings into consideration.

Figure 19:
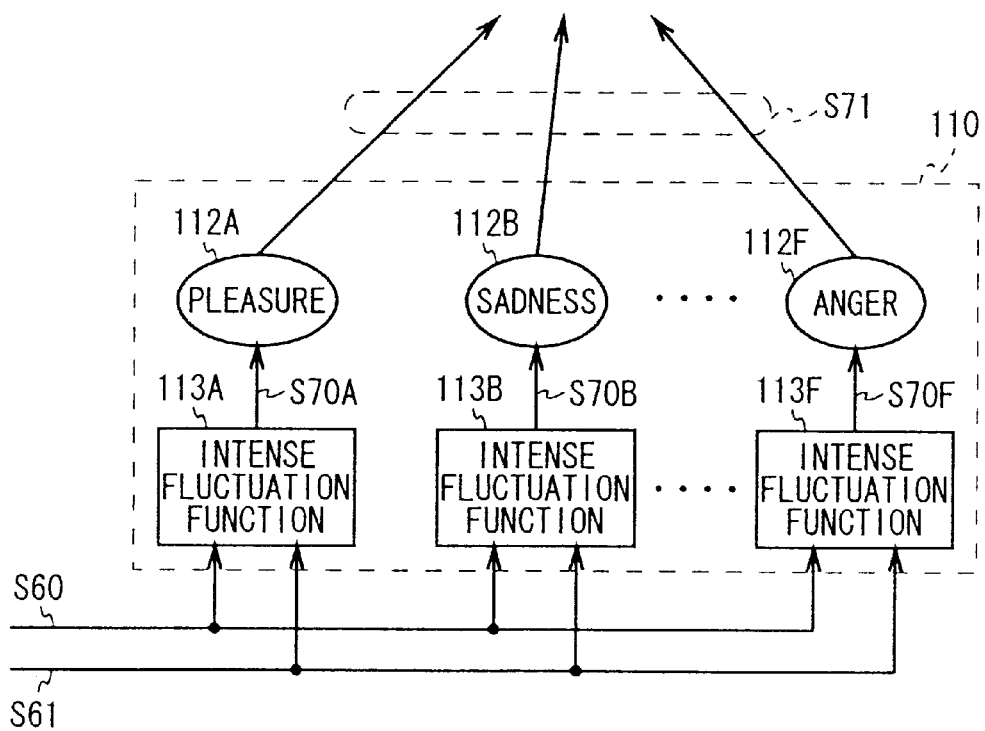
FIG. 19 is a block diagram explaining a feelings decision mechanism.
Figure 21:
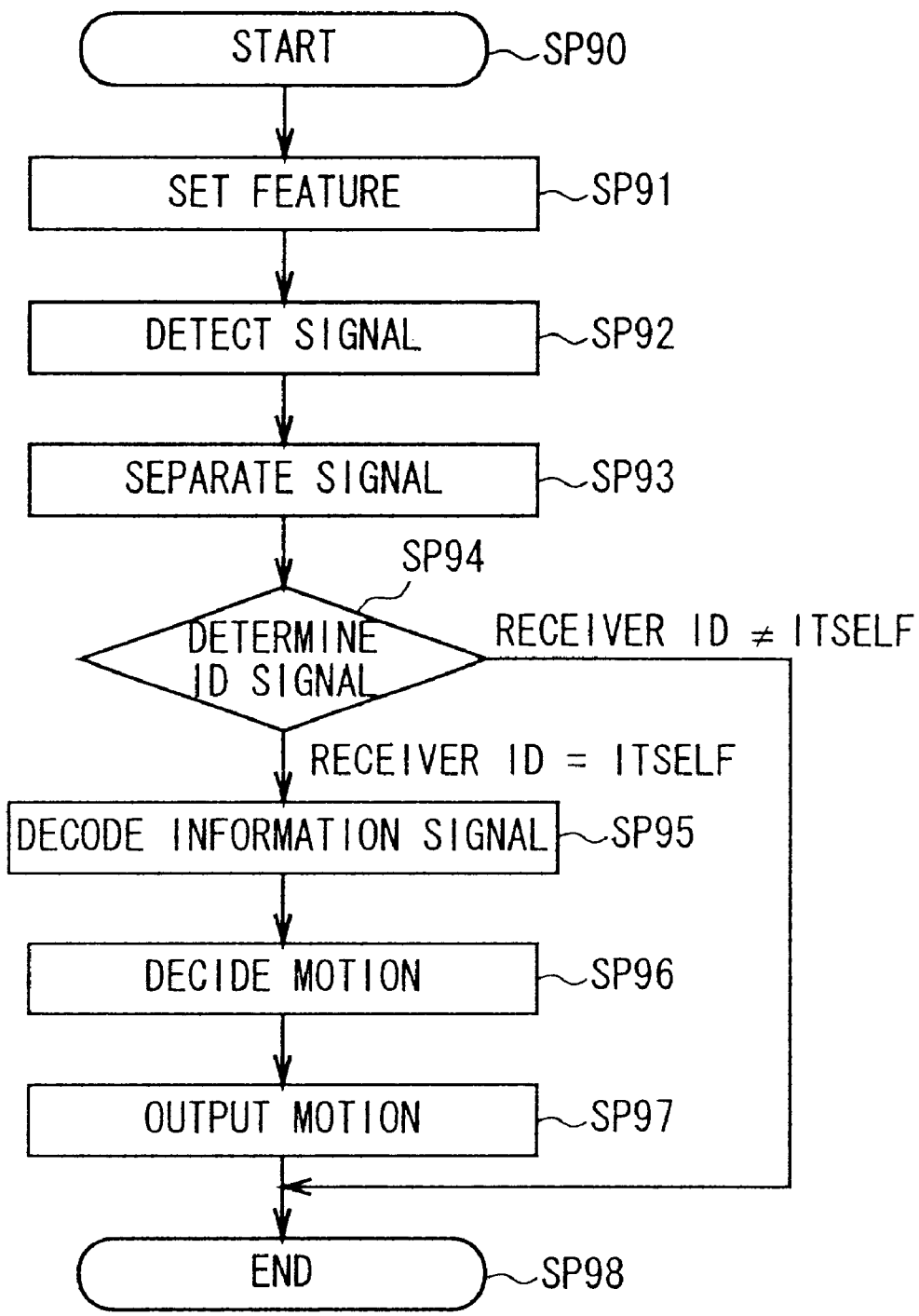
FIG. 21 is a flow chart showing a motion decision procedure by the CPU, corresponding to a role in a group.

In this case, as shown in FIG. 19, the feelings decision mechanism 110 is composed of feelings units 112A to 112F as feelings models which are provided respectively corresponding to six kinds of feelings, "pleasure", "sadness", "surprise", "terror", "hate", and "anger", and intense fluctuation functions 113A to 113F respectively corresponding to the feelings units 112A to 112F.

This intense fluctuation functions 113A to 113F are the ones for generating and outputting intense information S70A to 70F which increase or decrease intense of the feelings units 112A to 112F in accordance with previously set parameters as described later, on the basis of the communication information S61 and so on, given from the ID comparison unit 104.

And the feelings units 112A to 112F have intense of feelings from 0 level up to 100 level, and frequently change the intense based on the intense information S70A to S70F given from the intense fluctuation functions 113A to 113F respectively.

As described above, the feelings decision mechanism 110 decides the current feelings of the entertainment robot 1 by mixing the intense of these feelings units 112A to 112F together, and outputs the decision result to the motion decision mechanism 111 as the feelings information S71.

In this way, the entertainment robot 1 can have characteristics such as "easy to be angry" or "kind", by setting parameters of the intense functions of the feelings models.

And the feature setting unit sets the parameters of the intense fluctuation functions 113A to 113F to previously predetermined levels in accordance with the characteristics designated by the operator, so that the entertainment robot 1 is set to have the designated feelings and perform the designated action.

Figure 20:
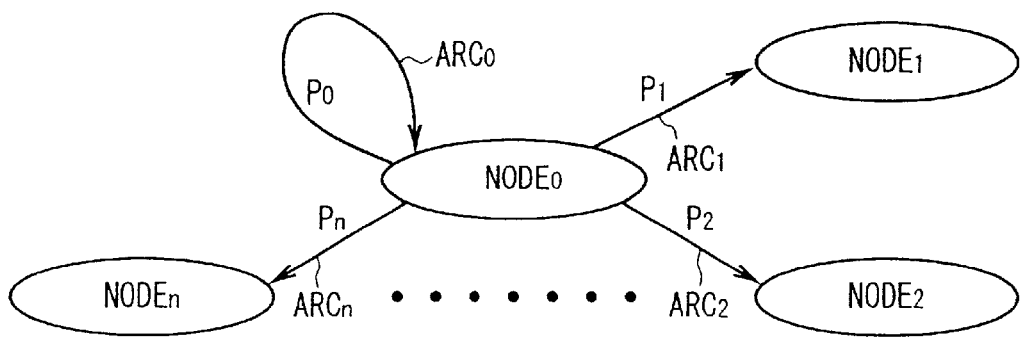
FIG. 20 is a conceptual diagram explaining an action model.

On the other hand, the motion decision mechanism 111 decides a next movement based on the feelings information given from the feelings decision mechanism 110 and the communication information S61 given from the ID comparison unit 104. To decide the next movement, in this case, the motion decision mechanism 111 uses a movement model called probability automaton; condition is represented by nodes $NODE_0$ to $NODE_n$, as shown in FIG. 20 and the transition from one node $NODE_0$ to the node itself or another node $NODE_0$ to $NODE_n$, is probably decided on the basis of transition probability $P_0$ to $P_n$ set for arc $ARC_0$ to $ARC_n$ which are used to connect between nodes $NODE_0$ to $NODE_n$. This movement model is previously stored in the memory 33 (FIG. 2).

When receiving the communication information S61 from the ID comparison unit 104 or when a fixed period of time has passed since the condition was transferred to the current condition (node $NODE_0$), the motion decision mechanism 111 decides next condition ($NODE_0$ to $NODE_n$) using the movement model while considering the current feelings of the entertainment robot 1 which is obtained based on the feelings information S71 and outputs the movements for the transition to the next condition, to the motion output unit as the aforementioned motion decision information S62, In this way, the entertainment robot 1 change its action patterns by changing the movement models which are used in the motion decision mechanism 111 of the motion decision unit 101. And in the memory 33 (FIG. 2), many kinds of movement models are stored corresponding to roles in a group such as a family.

When the operator designates a role of the entertainment robot 1, the feature setting unit 100 controls the motion decision mechanism 111 to use the proper movement model, so that the entertainment robot 1 performs movements corresponding to the role.

Hereinafter, with reference to a flow chart shown in FIG. 18, the description will be made of a motion decision procedure corresponding to the role in a group using the CPU 32. Starting with step SP90, in step SP91, the CPU 32 sets the parameters of the intense fluctuation functions 113A to 113F of the feelings decision unit 110 of the motion decision unit 101 on the basis of the role, and feelings and action pattern in a group inputted by the operator, and also controls the motion decision mechanism 111 of the motion decision unit 101 to perform setting so as to use a proper movement model.

In step SP92, the CPU 32 detects transmitted information from image signal S1A picked up by the television camera 10, and proceeds to step SP93 to separate this transmitted information into the sender ID, the receiver ID and the communication information. In step SP94, the CPU 32 judges whether or not its own robot is included in the receiver ID, on the basis of the list of discrimination information on the entertainment robots 1 stored in the memory 33, and as a result, if its own robot is included in the receiver ID, the process proceeds to step SP95 to decode the communication information.

In step SP96, the CPU 32 decides the next motion on the basis of the communication information S61 as described above, proceeds to step SP97 to perform the motion decided, and thereafter, proceeds to step SP98 to terminate the processing. In this respect, in step SP94, if its own robot is not included in the receiver ID, the process proceeds to step SP98 to terminate the processing.

(4) MOTION AND EFFECT

In the foregoing configuration, the CPU 32 judges whether or not transmitted information obtained through the input unit 30 from another entertainment robot 1 is for its own robot, and as a result, if it is for its own robot, the CPU 32 decides the motion on the basis of the transmitted information, whereby it becomes possible to operate in cooperation with other entertainment robots 1.

Therefore, a plurality of entertainment robots 1 autonomously communicate with each other to operate in cooperation regardless of the operator's instructions, whereby there is realized cooperation of a group of robots in various fields such as team play in a soccer game or the like, operations in a place and situation difficult for people, and imaginary family relationship.

According to the foregoing configuration, by deciding the next motion on the basis of transmitted information to be transmitted from other entertainment robots 1, it is possible to realize an entertainment robot 1 capable of operating in cooperation with other entertainment robots 1, and such entertainment robots 1 can construct a group of robots which autonomously act regardless of operator's instructions.

(5) OTHER EMBODIMENTS

In this respect, in the foregoing embodiment, the description has been made of the case when family relationship is constructed among a plurality of entertainment robots 1 with the feature setting unit 100, and the present invention is not limited thereto, but features of friend and enemy entertainment robots 1, and action patterns of friend, enemy and stranger entertainment robots 1 are set to cause them to perform actions corresponding to relationship between its own robot and other entertainment robots 1, whereby it can be possible to construct relationship similar to human relations among entertainment robots 1.

Further, in the foregoing embodiment, the description has been made of a case where family relationship has been constructed among a plurality of entertainment robots 1 with the feature setting units 100, and the present invention is not limited thereto, but by setting sex of entertainment robots 1 and action patterns corresponding to the sex, it can be possible to decide its own action depending on the sex of another robot and also possible to construct, among entertainment robots 1, relationship similar to relation with the opposite sex such as performing courtship action.

INDUSTRIAL APPLICABILITY

This invention can be utilized for amusement robots and industrial robots.

What is claimed is:

1. A robot apparatus adapted to operate in cooperation with other robot apparatuses each other, comprising:
   input means for receiving and inputting transmitted information transmitted from said another robot apparatus;
   motion decision means, which extracts, from said transmitted information, discrimination information for specifying a robot apparatus targeted for transmission and communication information to be communicated to said robot apparatus targeted for transmission, and which compares said discrimination information with discrimination information which is allocated to said robot apparatus in advance, to decide its motion on the basis of the comparison result and said communication information; and
   operating means for operating in accordance with the motion decided by said motion decision means.

2. The robot apparatus according to claim 1, wherein said communication information includes positional information indicating the present position of said another robot apparatus.

3. The robot apparatus according to claim 1, wherein said communication information includes number information indicating, out of robot apparatuses existing around said another robot apparatus, the number of said robot apparatuses belonging to the same group as said another robot apparatus, and the number of said robot apparatuses belonging to a group different from said another robot apparatus.

4. The robot apparatus according to claim 1, wherein said motion decision means extracts, from said transmitted information, discrimination information for specifying said robot apparatus targeted for transmission, discrimination information for specifying said another robot apparatus, and communication information to be communicated to said robot apparatus targeted for transmission, and compares the discrimination information for specifying said robot apparatus targeted for transmission with discrimination information which is allocated to said robot apparatus in advance, to decide the motion on the basis of the comparison result, the discrimination information for specifying said another robot apparatus, and said communication information.

5. The robot apparatus according to claim 1, wherein said motion decision means extracts, from said transmitted information, discrimination information for specifying said another robot apparatus, discrimination information for specifying said robot apparatus targeted for transmission, and communication information to be communicated to said robot apparatus targeted for transmission, and if said discrimination information for specifying said another robot apparatus coincides with discrimination information of a robot apparatus previously set out of a group of a plurality of robot apparatuses, communication information transmitted from said robot apparatus previously set is accepted in preference to communication information transmitted from any other robot apparatuses to decide the motion.

6. A robot apparatus adapted to operate in cooperation with other robot apparatuses each other, comprising:
   input means for receiving and inputting transmitted information transmitted from said another robot apparatus;
   motion decision means for deciding the next motion on the basis of said transmitted information in advance, and for generating and outputting, when a timing signal is inputted through said input means, a driving signal in synchronism with said timing signal to be inputted; and
   operating means for operating on the basis of said driving signal at timing when said driving signal is outputted from said motion decision means.

7. The robot apparatus according to claim 6, wherein said motion decision means determines, on the basis of a kind of said timing signal defined in said transmitted information, whether or not a signal inputted through said input means is a timing signal.

8. A robot apparatus adapted to operate in cooperation with other robot apparatuses each other, comprising:
   input means for receiving and inputting transmitted information transmitted from said another robot apparatus;
   motion decision means to which a role, and a feelings and action pattern of said robot apparatus in connection with said other robot apparatuses are set in advance, for deciding a motion on the basis of said role of said robot apparatus and said transmitted information; and
   operating means for operating in accordance with the motion decided by said motion decision means.

9. A robot apparatus adapted to operate in cooperation with other robot apparatuses each other, comprising:
   input means for receiving and inputting transmitted information transmitted from said another robot apparatus;
   motion deciding means to which a role and feelings and action patterns of said robot apparatus in connection with said other robot apparatuses are set in advance, for deciding feelings and action patterns of said robot apparatus, and also a motion based on said transmitted information; and
   operating means for operating in accordance with the motion decided by said motion deciding means.

* * * * *